(12) United States Patent
Constantinides

(10) Patent No.: US 11,323,855 B2
(45) Date of Patent: **\*May 3, 2022**

(54) SYSTEM AND METHOD FOR LOCATION-BASED CONTENT DELIVERY AND VISUALIZATION

(71) Applicant: YouMap, Inc., New York, NY (US)

(72) Inventor: Stephen Constantinides, New York, NY (US)

(73) Assignee: YouMap, Inc., New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/841,629

(22) Filed: Apr. 6, 2020

(65) Prior Publication Data

US 2020/0236514 A1   Jul. 23, 2020
US 2022/0046394 A9   Feb. 10, 2022

Related U.S. Application Data

(63) Continuation of application No. 16/164,624, filed on Oct. 18, 2018, now Pat. No. 10,616,727, and a continuation-in-part of application No. 15/189,691, filed on Jun. 22, 2016, and a continuation-in-part of application No. 16/035,380, filed on Jul. 13, 2018,
(Continued)

(51) Int. Cl.
*H04W 4/18*   (2009.01)
*H04L 51/10*  (2022.01)
*H04L 51/222* (2022.01)
*H04L 51/52*  (2022.01)

(52) U.S. Cl.
CPC ............ *H04W 4/185* (2013.01); *H04L 51/10* (2013.01); *H04L 51/20* (2013.01); *H04L 51/32* (2013.01)

(58) Field of Classification Search
CPC ........ H04W 4/185; H04L 51/10; H04L 51/20; H04L 51/32
See application file for complete search history.

(56) References Cited

U.S. PATENT DOCUMENTS 8,738,039 B2   5/2014   Forstall et al.
8,788,973 B2   7/2014   Lavigne et al.
(Continued)

FOREIGN PATENT DOCUMENTS

KR   1020160078703   7/2016
WO   2015021200 A1   2/2015
WO   2017120660 A1   7/2017

OTHER PUBLICATIONS

Reality Visualization in Engineering Education, 12th International Conference on Construction Application of Virtual Reality,Taipei, Taiwan, 292-299.
(Continued)

*Primary Examiner* — Julio R Perez
(74) *Attorney, Agent, or Firm* — Redbrick IP, P.C.

(57) ABSTRACT

A system and method for providing location information on a social network, including: sending, to a social mapping system, a request for one or more social media posts, wherein the request includes screen attribute information about a display of a client device, geographic location information, and an identification of a requesting account of the social network; receiving, in response to the request, a suggested group for display by the client device; and displaying, by the client device, the suggested group.

19 Claims, 15 Drawing Sheets

Related U.S. Application Data now abandoned, and a continuation-in-part of application No. 16/036,923, filed on Jul. 16, 2018.

(60) Provisional application No. 62/183,068, filed on Jun. 22, 2015, provisional application No. 62/532,007, filed on Jul. 13, 2017, provisional application No. 62/549,447, filed on Aug. 24, 2017, provisional application No. 62/532,991, filed on Jul. 14, 2017, provisional application No. 62/574,199, filed on Oct. 18, 2017.

(56) References Cited

U.S. PATENT DOCUMENTS

| | | | |
|---|---|---|---|
| 9,183,807 B2 | 11/2015 | Small et al. | |
| 9,509,787 B2 | 11/2016 | Li | |
| 9,613,003 B1 | 4/2017 | Goodspeed | |
| 9,633,695 B2 | 4/2017 | Axen et al. | |
| 9,712,587 B1 | 7/2017 | Alfishawi et al. | |
| 9,715,482 B1 | 7/2017 | Bjorkegren | |
| 9,826,345 B2* | 11/2017 | Haro | G06Q 50/01 |
| 10,387,574 B1* | 8/2019 | Anders | G06F 40/30 |
| 2007/0147654 A1 | 6/2007 | Clatworthy et al. | |
| 2007/0226063 A1 | 9/2007 | Hanson | |
| 2008/0215994 A1 | 9/2008 | Harrison et al. | |
| 2008/0222295 A1 | 9/2008 | Robinson et al. | |
| 2008/0288406 A1 | 11/2008 | Seguin et al. | |
| 2010/0131366 A1 | 5/2010 | Gibson et al. | |
| 2010/0164957 A1 | 7/2010 | Lindsay et al. | |
| 2010/0180029 A1 | 7/2010 | Fourman | |
| 2010/0305855 A1* | 12/2010 | Dutton | H04L 67/306 |
| | | | 701/469 |
| 2011/0238755 A1 | 9/2011 | Khan et al. | |
| 2011/0238762 A1 | 9/2011 | Soni et al. | |
| 2011/0238763 A1 | 9/2011 | Shin et al. | |
| 2011/0246910 A1 | 10/2011 | Moxley et al. | |
| 2012/0135784 A1 | 5/2012 | Lee et al. | |
| 2012/0143963 A1 | 6/2012 | Kennberg et al. | |
| 2013/0060873 A1 | 3/2013 | Gautam et al. | |
| 2013/0066963 A1 | 3/2013 | Odio et al. | |
| 2013/0072235 A1 | 3/2013 | Forstall et al. | |
| 2013/0073387 A1 | 3/2013 | Heath | |
| 2013/0073970 A1* | 3/2013 | Piantino | G06F 3/0481 |
| | | | 715/738 |
| 2013/0080922 A1 | 3/2013 | Elias et al. | |
| 2013/0110631 A1 | 5/2013 | Mitchell | |
| 2013/0139070 A1 | 5/2013 | Baldwin et al. | |
| 2013/0196690 A1 | 8/2013 | Crowley et al. | |
| 2013/0198661 A1 | 8/2013 | Matas | |
| 2013/0201185 A1 | 8/2013 | Kochi | |
| 2013/0232011 A1 | 9/2013 | Gupta et al. | |
| 2013/0242262 A1 | 9/2013 | Lewis | |
| 2013/0321390 A1 | 12/2013 | Latta et al. | |
| 2014/0002442 A1 | 1/2014 | Lamb et al. | |
| 2014/0046591 A1 | 2/2014 | Boldyrev et al. | |
| 2014/0101601 A1 | 4/2014 | Tang | |
| 2014/0181193 A1 | 6/2014 | Narasimhan | |
| 2014/0236882 A1 | 8/2014 | Rishe | |
| 2014/0250200 A1 | 9/2014 | Geurts et al. | |
| 2014/0274564 A1 | 9/2014 | Greenbaum | |
| 2014/0280278 A1 | 9/2014 | Harris et al. | |
| 2014/0359537 A1 | 9/2014 | Jackobson et al. | |
| 2014/0316192 A1 | 10/2014 | Massimiliano et al. | |
| 2014/0316691 A1 | 10/2014 | Ren et al. | |
| 2015/0032766 A1 | 1/2015 | Greenbaum | |
| 2015/0039443 A1 | 2/2015 | Soon-Shiong | |
| 2015/0058255 A1 | 2/2015 | Cork | |
| 2015/0061825 A1 | 3/2015 | Suzuki et al. | |
| 2015/0169142 A1 | 6/2015 | Longo et al. | |
| 2015/0220802 A1 | 8/2015 | Mazur et al. | |
| 2015/0245168 A1 | 8/2015 | Martin | |
| 2015/0262208 A1 | 9/2015 | Bjontegard | |
| 2015/0302651 A1 | 10/2015 | Shpigelman | |
| 2015/0310497 A1 | 10/2015 | Valin et al. | |
| 2015/0325226 A1 | 11/2015 | Rosedale et al. | |
| 2015/0378587 A1 | 12/2015 | Falaki et al. | |
| 2016/0019661 A1 | 1/2016 | Bouganim et al. | |
| 2016/0027329 A1 | 1/2016 | Jerauld | |
| 2016/0029368 A1 | 1/2016 | Borenstein | |
| 2016/0055250 A1 | 2/2016 | Rush | |
| 2016/0080438 A1 | 3/2016 | Liang | |
| 2016/0142894 A1 | 5/2016 | Papakonstantinou et al. | |
| 2016/0169696 A1 | 6/2016 | Butts et al. | |
| 2016/0203223 A1* | 7/2016 | Hladik, Jr. | H04L 67/306 |
| | | | 707/771 |
| 2016/0232131 A1 | 8/2016 | Liu et al. | |
| 2017/0109807 A1* | 4/2017 | Krishnan | G06Q 30/0253 |
| 2017/0127128 A1 | 5/2017 | Seger | |
| 2017/0134508 A1 | 5/2017 | Kalis et al. | |
| 2017/0139207 A1 | 5/2017 | Jenabzadeh | |
| 2017/0193075 A1 | 7/2017 | Hegelich et al. | |
| 2017/0200296 A1 | 7/2017 | Jones et al. | |
| 2017/0220966 A1 | 8/2017 | Wang | |
| 2017/0270821 A1 | 9/2017 | Jerauld | |
| 2017/0295127 A1 | 10/2017 | He | |
| 2018/0004762 A1 | 1/2018 | Jazayeri | |
| 2018/0006993 A1 | 1/2018 | Jazayeri | |
| 2018/0060778 A1 | 3/2018 | Guo et al. | |
| 2018/0121029 A1 | 5/2018 | Mrad et al. | |
| 2018/0293308 A1 | 10/2018 | Miller et al. | |
| 2020/0242182 A1* | 7/2020 | Gokyigit | G06F 3/0482 |

OTHER PUBLICATIONS

Dias, A., 2009. Technology Enhanced Learning and Augmented Reality: An Application on Multimedia Interactive Books, International Business & Economics Review, vol. 1, n.1.

International Search Report and Written Opinion received in PCT/US18/42169, dated Sep. 24, 2018 (10 pages).

International Search Report and Written Opinion received in PCT/US18/42355, dated Oct. 1, 2018 (10 pages).

Shirazi, A., 2014. Context-Aware Mobile Augmented Reality Visualization in Construction Engineering Education, Electronic Theses and Dissertations, University of Central Florida. Paper 4510.

Specht, M. et al., 2011. Mobile Augmented Reality for Learning: A Case Study. Journal of The Research Center For Educational Technology, 7(1). Retrieved Jan. 18, 2012, from http://www.rcetj.org/index.php/rcetj/article/view/151.

R. Wang et al., "Taxi Rec: Recommending Road Clusters to Taxi Drivers Using Ranking-Based Extreme Learning Machines," in IEEE Transactions on Knowledge and Data Engineering, vol. 30, No. 3, pp. 585-598, Mar. 1, 2018, doi:10.1109/TKDE 2017. 2772907. (Year: 2018).

D. Widdows, J. Lucas, M. Tang and W. Wu, "GrabShare: The construction of a realtime ridesharing service," 2017 2nd IEEE International Conference on Intelligent Transportation Engineering (ICITE), 2017, pp. 138-143, doi: 10.1109 ICITE.2017.8056896. (Year: 2017).

I. Cho, R. Wesslen, S. Volkova, W. Ribarsky and W. Dou, "CrystalBall: A Visual Analytic System for Future Event Discovery and Analysis from Social Media Data," 2017 IEEE Conference on Visual Analytics Science and Technology (VAST), 2017, pp. 25-35, doi: 10.1109NAST.2017.8585658 (Year: 2017).

Y. Tian, W. Wei, Q. Li, F. Xu and S. Zhong, "MobiCrowd: Mobile Crowdsourcing on Location-based Social Networks," IEEE Infocom 2018—IEEE Conference on Computer Communications, Honolulu, HI, USA, 2018, pp. 2726-2734, doi: 10.1109/ INFOCOM.2018. 8486433. (Year: 2018).

J. A. B. Perera, D. Zhang and M. Lu, "Smart Maps through Semantic Web, Social Media, and Sentiment Analysis," 2015 IEEE International Conference on Information Reuse and Integration, San Francisco, CA, 2015, pp. 49-56, doi 10.1109/IRI.2015.18. (Year: 2015).

* cited by examiner

SYSTEM AND METHOD FOR LOCATION-BASED CONTENT DELIVERY AND VISUALIZATION

CROSS-REFERENCE TO RELATED APPLICATIONS

This application is a continuation of copending U.S. patent application Ser. No. 16/164,624, "SYSTEM AND METHOD FOR LOCATION-BASED CONTENT DELIVERY AND VISUALIZATION", filed Oct. 18, 2018, the entire disclosure of which is incorporated by reference herein, in its entirety, for all purposes.

U.S. patent application Ser. No. 16/164,624 claims the benefit of U.S. Provisional Patent Application Ser. No. 62/574,199, "SYSTEM AND METHOD FOR LOCATION-BASED CONTENT DELIVERY AND VISUALIZATION", filed Oct. 18, 2017, the entire disclosure of which is incorporated by reference herein, in its entirety, for all purposes.

This application is a continuation-in-part of copending U.S. patent application Ser. No. 15/189,691, "REAL TIME GEO-SOCIAL VISUALIZATION PLATFORM", filed Jun. 22, 2016, the entire disclosure of which is incorporated by reference herein, in its entirety, for all purposes. U.S. patent application Ser. No. 15/189,691 claims the benefit of U.S. Provisional Patent Application Ser. No. 62/183,068, "REAL TIME GEO-SOCIAL VISUALIZATION PLATFORM", filed Jun. 22, 2015, the entire disclosure of which is incorporated by reference herein, in its entirety, for all purposes.

This application is a continuation-in-part of copending U.S. patent application Ser. No. 16/035,380, "SYSTEM AND METHOD FOR PRESENTING COMMUNITY EMOTIVE DATA GEOGRAPHICALLY ON A SOCIAL MAPPING NETWORK", filed Jul. 13, 2018, the entire disclosure of which is incorporated by reference herein, in its entirety, for all purposes. U.S. patent application Ser. No. 16/035,380 claims the benefit of U.S. Provisional Patent Application Ser. No. 62/532,007, "SYSTEM AND METHOD FOR PRESENTING COMMUNITY EMOTIVE DATA GEOGRAPHICALLY ON A SOCIAL MAPPING NETWORK", filed Jul. 13, 2017, the entire disclosure of which is incorporated by reference herein, in its entirety, for all purposes.

This application is a continuation-in-part of copending U.S. patent application Ser. No. 16/036,923, "SYSTEM AND METHOD FOR AGGREGATION AND GRADUATED VISUALIZATION OF USER GENERATED SOCIAL POST ON A SOCIAL MAPPING NETWORK", filed Jul. 16, 2018, the entire disclosure of which is incorporated by reference herein, in its entirety, for all purposes. U.S. patent application Ser. No. 16/036,923 claims the benefit of U.S. Provisional Patent Application Ser. No. 62/549,447, "SYSTEM AND METHOD FOR AGGREGATION AND GRADUATED VISUALIZATION OF USER GENERATED SOCIAL POST ON A SOCIAL MAPPING NETWORK", filed Aug. 24, 2017, the entire disclosure of which is incorporated by reference herein, in its entirety, for all purposes. U.S. patent application Ser. No. 16/036,923 claims the benefit of U.S. Provisional Patent Application Ser. No. 62/532,991, "SYSTEM AND METHOD FOR AGGREGATION AND GRADUATED VISUALIZATION OF USER GENERATED SOCIAL POST ON A SOCIAL MAPPING NETWORK", filed Jul. 14, 2017, the entire disclosure of which is incorporated by reference herein, in its entirety, for all purposes.

BACKGROUND

Recent advancements in computing technology and Global Navigation Satellite Systems (GNSS) have led to a movement for creating Internet-connected devices associated with their locations. Less expensive hardware has contributed to a trend in which traditional devices that connected via telephony and the Internet (e.g., email) now include location sharing. This has also lead to significant technical challenges in the development of client software and services to fully utilize these devices' capabilities.

As the number and type of network-connected computing devices has increased, there has been a fragmentation of content availability and quality among the various platforms. While some platforms provide social networking with friends, they may not provide information on where a particular friend is located. Further, current systems are not configured well to display where friends are located, where posts on a network are made, and where posts associated with locations are made.

Even adding a single letter to map pins, scaling to the considerable quantity of data shown on a social network, such as those even with word limitations, quickly becomes impossible. The information could become incomprehensible and you may lose the essence of the posted information.

Thus, there is a need in the art for devices and systems that allow users to view posts in a digestible manner. Problems described herein are difficult to solve, and require unobvious solutions—which is the main reason such a social network has not been created. The inventions require the technological developments of today's portable devices including GNSS receivers and various networks, and would not have been possible even a few years ago.

The disclosures herein are not a small leap over the prior art, but rather a technological disruption in the social media space. A complete rethinking was required to produce solutions to the difficult problems presented herein. Creating such a platform made for mobile devices with limited screen space is even more difficult, due to space limitations. This is compounded by the fact that it's difficult to convey contextual and emotional information with few words, and maps typically have little space to convey information.

SUMMARY

In general, in one aspect, embodiments relate to a system for providing location information on a social network. The system can include: a computer processor; and a social mapping module executing on the computer processor and configured to enable the computer processor to: receive, from a client device, a request for one or more social media posts, where the request includes screen attribute information about a display of the client device, geographic location information, and an identification of a requesting account of the social network; identify a set of temporally recent social media posts based on the screen attribute information and the geographic location information; apply, by the computer processor, grouping criteria to the set of social media posts to generate a suggested group, where: the suggested group is a subset of the set of social media posts, and applying the grouping criteria includes: ranking each social media post of the set of social media posts according to a customized score for each social media post, where the customized score is based on a set of preference factors, corresponding to the requesting account, applied to a general score of each social media post, and selecting, based the ranking, the subset of the set of social media posts for inclusion in the suggested group, where the selecting includes excluding at least one social media post of the set of social media posts from inclusion in the suggested group based on the ranking; provide, in response to the request, the suggested group for display by the client device.

In general, in one aspect, embodiments relate to a method for providing location information on a social network. The method can include: receiving, from a client device, a request for one or more social media posts, where the request includes screen attribute information about a display of the client device, geographic location information, and an identification of a requesting account of the social network; identifying a set of temporally recent social media posts based on the screen attribute information and the geographic location information; applying, by a computer processor, grouping criteria to the set of social media posts to generate a suggested group, where: the suggested group is a subset of the set of social media posts, and applying the grouping criteria includes: ranking each social media post of the set of social media posts according to a customized score for each social media post, where the customized score is based on a set of preference factors, corresponding to the requesting account, applied to a general score of each social media post, and selecting, based the ranking, the subset of the set of social media posts for inclusion in the suggested group, where the selecting includes excluding at least one social media post of the set of social media posts from inclusion in the suggested group based on the ranking; providing, in response to the request, the suggested group for display by the client device.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1:
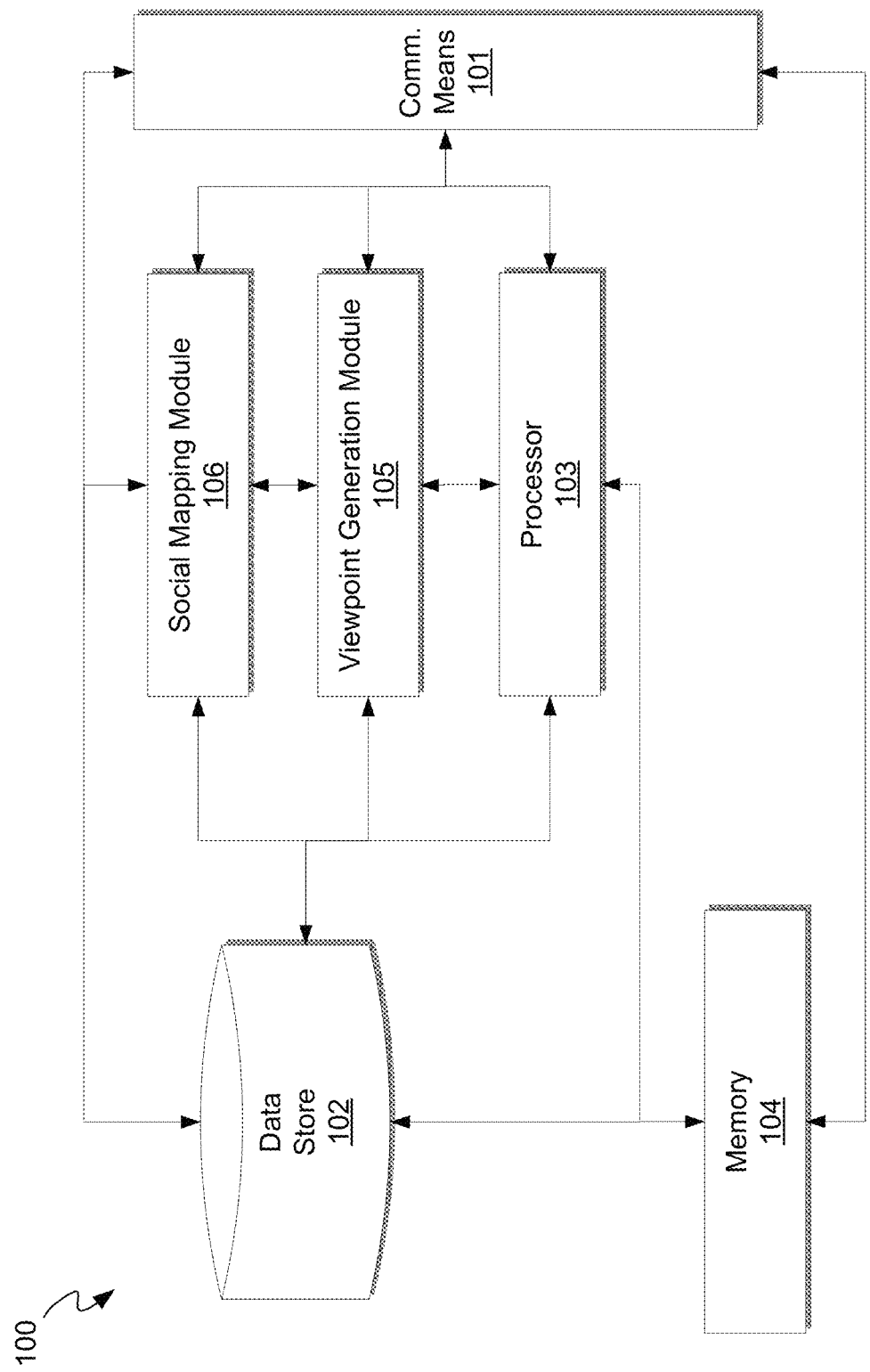
FIGS. 1-2 illustrate exemplary schematic diagrams of a system, in accordance with one or more embodiments of the invention.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for aggregating, delivering, and/or creating visualizations of content in a location-based content platform. For example, mobile applications executing on devices of many millions of users can be enabled to send and receive content in real time to components of the location-based content platform. One or more of the mobile applications can be configured to provide contextual data associated with the user, device, and/or environment, and to receive data from the location-based content platform for display to the user. The received data can include map-based visualizations rendered by the mobile device and displayed to the user for rapid consumption and understanding of proximity-based, social, sentiment, or other data.

In various embodiments, systems described herein are social networks (e.g., wherein a user is connected to one or more, as with Facebook™ or Quora™). A user/profile may have connections and non-connections. In various embodiments, posts may appear on a screen (also interchangeably referred to herein as a display) of a client device such that they appear to be covering a map. In other words, in some embodiments a user may view posts on their display and see posts overlaying a map, such that a user may easily identify posts that are associated with a given area.

As described herein, due to: (1) a potential amount of posts (e.g., hundreds or thousands; and (2) the amount of screen real estate on a client device, some posts may need to be shown more predominantly than others. For example, some posts may be larger than other posts so a user can easily view them. If, for instance, all posts were the same size and all shown at the same time, then hundreds or thousands of posts would overcrowd a display making the map, and therefore the posts, virtually useless (e.g., as shown in FIG. 3B).

Figure 3A:
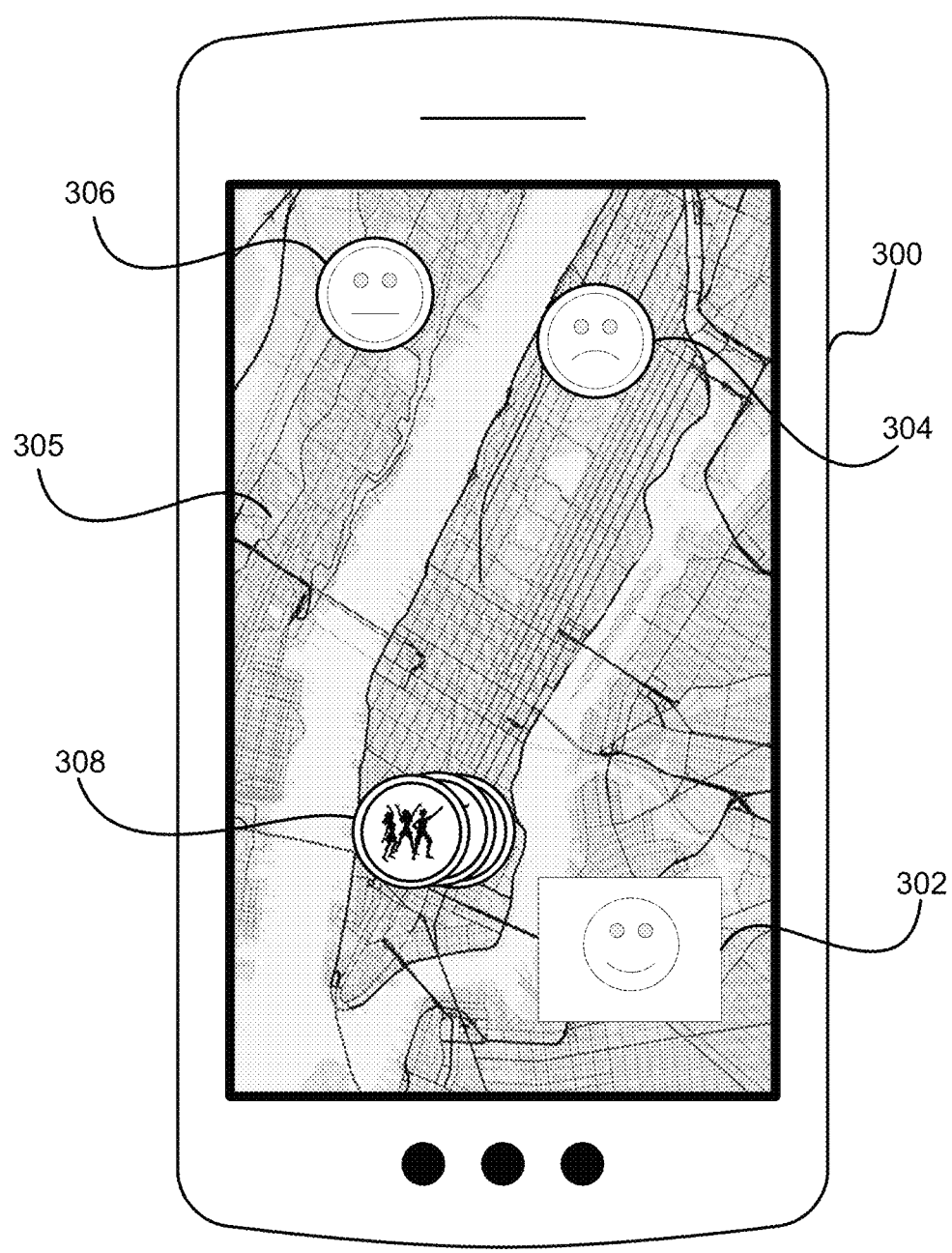
FIGS. 3A-3E illustrate exemplary client devices, in accordance with one or more embodiments of the invention.
Figure 3B:
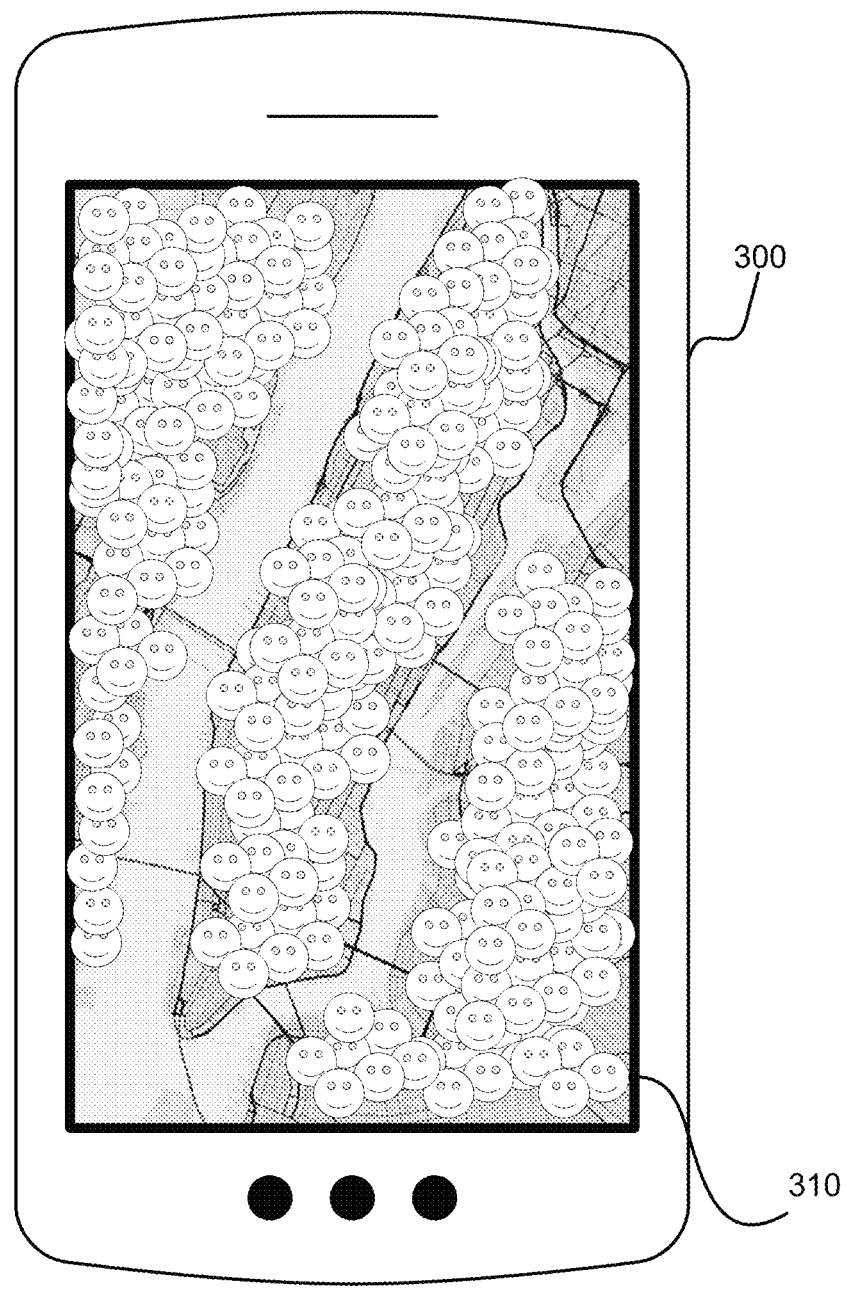
Figure 3C:
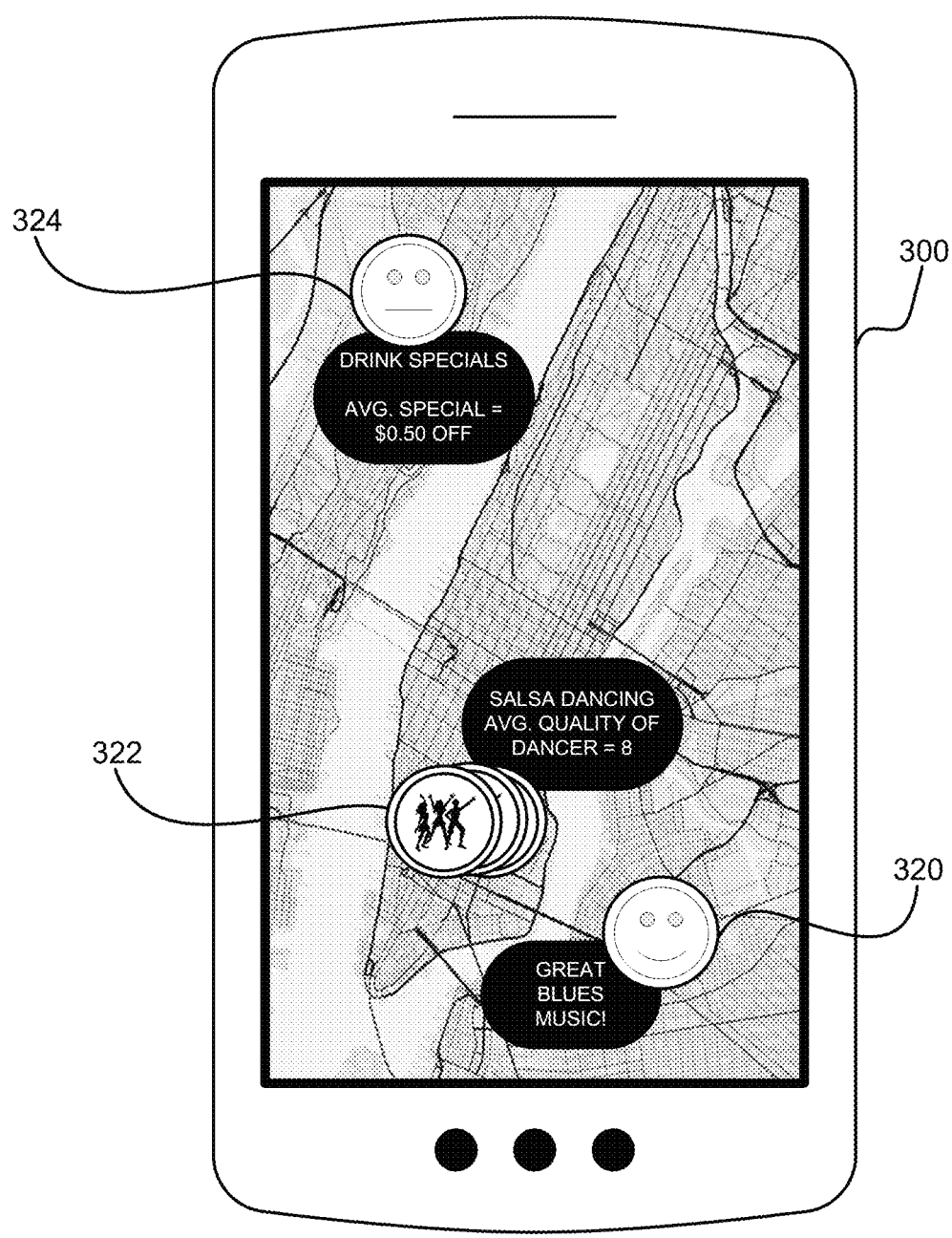

Thus, in various embodiments (e.g., as shown in FIG. 3C) rather than show many posts of the same size, which may be indistinguishable from one another, some posts may be shown as being larger, with a different color, be associated with an emotion (which may be indicated by an emoticon/emoji), be shown as a small cluster, or otherwise be more displayed more predominantly than other posts. Further, in various embodiments, when a user has zoomed out, they may see posts that have a high importance level (also referred to herein interchangeably with a value or a score), and when they zoom in on an area, a system may show a user posts with lower importance values. As such, various posts may be filtered out when a user is viewing a map from a certain "altitude." In other words, from a distance a user may see things that are important to them—wherein importance can be based on a variety of factors—while when close up a user may be able to see posts that were not so important to them, but may be shown for one or more other reasons (e.g., other than the user's preferences).

In some embodiments, posts made by connections may be more relevant than others. For example, posts that are related to a particular category (also interchangeably referred to herein as a channel) may be more important/relevant to a user than others (e.g., the post may have a higher value), and thus those posts may be displayed more predominantly than other posts.

Similarly, in some embodiments, posts may be more relevant/important based on time. For example, if posts were made within the previous 1-2 hours they may be displayed on a screen more predominantly than posts that were made a day or two before. In some embodiments, posts that were made on the same day of the week (e.g., Friday), time of the year (e.g., Christmas), and/or have some type of unique/important/relevant temporal aspect may be shown more predominantly than other posts.

Further, posts may be ephemeral in nature. For example, if a system knows that a happy hour will end at a certain time (e.g., because a user or restaurant owner makes a post indicating so), then a post may quickly become less predominant when the happy hour ends—as opposed to a post about a party which slowly dies down over the course of 2-3 hours. Similarly, a system that provides posts about clubs, restaurants, museums, zoos, or any other place that closes may cause the posts about those places to disappear quickly when the location and/or venue closes. In some embodiments, if a user sets up their system such that they rank where their friends are very highly (in one way or another), when their friends move from one place to another a post made by a friend or someone else at a location may disappear much quicker than if it had been made by someone ranked lower (e.g., a stranger to the user).

Just as various posts may be ephemeral in nature, in some embodiments posts will last longer than other posts. For example, if a user makes a channel that ranks salsa dancing very highly, then a post about a salsa club may be displayed more predominantly and/or for a longer period of time than a jazz club which may have more people or otherwise be more fun to a greater number of users of the social network.

As can be seen, bubbles or other symbols used to symbolize posts may be based on an amount of time, or an amount of an activity per time (e.g., the speed of a bartender, the amount of bikes at a bike party, the number of people in a particular area over a given amount of time). In other words, a location or post's importance may be based on a type of activity, how relevant an activity is to a user (e.g., based on a user profile corresponding to a user), whether a location/activity is trending (e.g., it is gaining in value/importance faster than other locations/activities, etc.

While various social media platforms now may provide users with trending topics (e.g., Reddit™, Facebook™), embodiments described herein tend to focus on how a social media platform can operate on a map. For example, while Reddit™ may have a front page with posts that are trending or otherwise have a higher value than posts on a second page, posts that are trending or otherwise have a higher value than other posts may be shown when a user is further zoomed out, and the user may see posts with lower values (e.g., posts that would be on a second or third page of Reddit™) as the system zooms in on a smaller area.

Also, in various embodiments described herein, a user may be able to curate their own map. For example, a user may create a plurality of channels which may, or may not, be combined to sus out venues and/or activities they may not have otherwise known about. For example, a user can create a channel associated with Japanese culture and shows museums, concerts, plays, festivals, and other events and/or locations that are related to Japanese culture. At the same time, that user may have a channel for bars, or even karaoke bars. In such a case, a system may be configured to receive input that causes maps to interact with each other (e.g., determine an activity/location that the two maps have in common). In the example described above, a user causes a device to combine Japanese Culture and Karaoke, in which case a map may show a user various Karaoke bars around a city. In some embodiments, a user may have a third channel or more, which may indicate that a user is interested in private places, or after-hour clubs. In such a case, a system may further filter out Karaoke bars that are not open late or that are too busy.

By adding one channel (which may be referred to as a type of map) onto another, a user may be able to predetermine their perfect night based on a variety of attributes described herein such as whether a user's group of friends are moving from one late night Karaoke bar to another. In addition to friends, a type of community, a history of an area or community, the amount of followers a person has that is making posts, an age of a person that is making posts (e.g., under 21), may all contribute to the value associated with a venue, location, party, activity, sporting event, etc.

FIG. 1 shows a system 100 for receiving location information on a social network. The system 100 includes a communication means 101, a data store 102, a processor 103, memory 104, a viewpoint generation module 105, and a social mapping module 106. Various components of system 100 can be located on a client device (e.g., a mobile device, personal computer, laptop, personal digital assistant, smartphone, kiosk, cable box, television) and/or a remote computer (e.g., a server, the cloud). In one or more embodiments there can be more than one of each separate component running on a device, as well as any combination of these components within a given embodiment of the invention. Further, in one or more embodiment a client device may receive information from a social network, such as a post, and/or a remote computer may receive information from a social network, such as a post.

In one or more embodiments, a social mapping module 106 may be included in system 100. A social mapping module 106 may execute on a computer processor and be configured to enable a computer processor to perform a variety of tasks. In one or more embodiments, a social mapping module may receive social mapping data (e.g., a post, which may be received from data store 102), where the social mapping data is associated with one or more geographic locations. For example, social mapping data may be used to identify and/or locate places where the social mapping data (e.g., posts) are being received from, and where viewpoints are focused.

In one or more embodiments, a viewpoint is a graphical representation of social mapping data displayed on a client device. A viewpoint may show an area of a map encompassing 100 meters, 1000, meters, 10 km, etc. In one or more embodiments a viewpoint may be based on a type of area shown on a map. For example, a viewpoint may be of a smaller area (e.g., a relatively smaller area of a map is shown on a display) if the area is an urban environment and/or includes many locations associated with posts, or a viewpoint may be of a larger area (e.g., a relatively larger area of a map is shown on a display) if the area is a rural environment. The same may be applicable to areas where a threshold amount of posts (e.g., social mapping data) are located regardless of a type of an area represented on a map.

In addition to a social mapping module 106 and a viewpoint generation module 105, system 100 may include a communication means which can transmit and/or receive information to/from a client device, a network, a multi-tenant network (e.g., the cloud), a network interface controller, a network gateway, etc.

In one or more embodiments, a client device may submit a post to data store 102. Such a post may include a graphical symbol received by a client device. The post may be associated with an emotional state received by the client device, which may be represented by a color. In one or more embodiments, an emotional state may be represented as a value. For example, a user of a smartphone may provide input to smartphone causing the creation of a post, and the user may cause the smartphone to cause the post to be associated with a location, an emotional state value (e.g., where 0 is sad and 10 is happy, and where other numbers may represent angry, depressed, bored, etc.) and other things including, but not limited to: a store, a person, another user of the social network, an image, a video, audio, a time, a date, a symbol, a pictograph, an ideograph, an ideogram, a smiley, an emoji, an emoticon, an emoji bubble (e.g., a shape including/containing an emoji). In one or more embodiments, a user may not know an emotional state value. For example, a user may select an emotional state of sad without knowing that a system represents sad with a value such as 0. In one or more embodiments, emotional state values may be represented by both symbols and values.

In one or more embodiments, system 100 (which the social network may at least in part run on) may receive posts, which may be stored in data store 102. System 100 (e.g., via social mapping module 106) may create a map and/or associate posts with locations on a map, which may then be transmitted to a client device and displayed on a screen of a client device. Based on input from a client device, system 100 (e.g., mapping module 106 and/or viewpoint generation module 105), which may be hosted remotely from a client device, may associate material to display on a client device including, but not limited to: at least a portion of a map, at least one or more posts which may be represented by one or more symbols, one or more colors representative of an attribute associated with a post (e.g., an emotion), an emoji, an emoji bubble, an image (e.g., of a location), a video (e.g., of the interior of a location, which may have been recorded within a particular period of time such as the previous hour), etc.

In some embodiments, users may be provided with a mode of posting providing the ability to tag symbols, emoji's, further enabling the ability to tag emotions (e.g., sentiment) and/or contextual cues (displayed in different formats such as color). In addition to including/displaying this content within a social media/online post, this information may also be displayed as the main mode of information transmittal, with word usage being secondary. Different contextual data sets may be combined into a single visualization for quick comprehension of the meaning of the posted data. These (e.g., the contextual data sets and/or visualizations) may include, but are not limited to: the tagging/inputting of emotional data using color, selecting symbols or "emojis" to visualize contextual information, by adding photos and/or multimedia, and/or tag/entering of questions on a map (e.g., such that another user of the social network may respond).

As described above, a system can be configured to pull these types of attributes together into a single data set visualized on the map. Each data set can be represented alone or concurrently with other data sets.

In one or more embodiments, screen attributes of a client device may be determined. Determining screen attributes of a client device may be performed at the client device or remote from the client device (e.g., at social mapping module 106 and/or viewpoint generation module 105). Screen attributes may include, but are not limited to: a size and shape of a screen, a current zoom level, a pan location, an availability of screen space, a viewing angle, an amount of transparency of a screen, and/or an amount of screen space. Further, screen attributes may be used to determine what is shown on a display, including, but not limited to: an amount of a map, a number of posts, a number of symbols representing posts, whether multiple posts/symbols should be represented by fewer (e.g., a single or a few) posts and/or symbols, a number of emojis, notifications associated with a social network, an amount of icons, types of illustrations, and/or a resolution of one or more displayed objects.

In one or more embodiments, transforming the visualization of content of a post dependent on a user's screen information can involve the following: a user's viewport or a user's desired viewpoint, a user's zoom level, a user's pan location (e.g., an area where they have moved their view above), and/or a user's screen dimensions.

In one or more embodiments, using this information to change the displayed post can include, but is not limited to: displaying indicators of total user activity variously as heat maps, dots, or other indications to show total amount activity, or all posts at any given time; showing, at a zoom level that is further out, an aggregate of user posts as a single bubble, and/or displaying a slideshow of user posts (e.g., multiple pictures and/or text) within or adjacent to that bubble. In this way, a system may act like a visual summarization of posted content at higher zoom levels. As another example of what happens when a user zooms in on a location, individual bubbles (or other types of posts) may convey a specific post from a user (which may be designated for a specific person or group of people). Further, in some embodiments a system may simply show only as many bubbles on screen at a given time based on a user's available screen space. This may prevent the overlap of posted information, making the system easier to use. In some embodiments user's may cycle through which post and/or channel to show and hide as the user's viewport changes. Further, a user's device may reveal hidden text, allowing those words to unfurl/become visible in response to screen real estate becoming available.

Methods discussed herein allow users to get an overall "gist" of total activity in a certain area. If bubbles popped up randomly, without showing the total activity in an area, users would be aware of information but never know the total aggregate of human or content activity in a specified area. This could be done by showing a heat map, or other visualization methods to show overall system activity. The platform may use dots, that even at their most minimum are colored, showing tagged emotional information.

In addition to, or instead of dots and heat maps, Emojis may populate a map to allow contextual information to be shown with little word usage. Emojis enable expression of social posts and bring context to posts without using words. When combined with bubble UI elements of the location-based content platform (and/or sentiment module and/or a mood expression system), as a whole it allows a user to communicate "what's happening", the emotion behind the thought. The system combines this symbolization selection with mood selectors to bring multiple emotional and contextual indicators into a post replacing the need for words, which are secondary.

As described herein, in one or more embodiments, the system finds the most relevant posts for a given (geographical) area and lists them in order of importance (e.g., gives them an importance value as compared to other posts). The system can then add those posts to a map in order of importance. If any post would fall on top of another post, then it may not be displayed or vanish. This ensures that only the most relevant posts are displayed and are never hidden or cluttered. The system determines what transformation effect to show (e.g., a fade out vs. an abrupt stop), which bubble items to show, and which form to show at any given time based on one or more attributes. Such attributes may include, but are not limited to: a number of votes a post has received, when the post was posted, how long ago, and/or how many comments the post has.

Integrating emotional or contextual cues and visualizing them as color or symbolization as part of a single post rather than using words may enhance a system's capabilities (comprehension) and space requirements over using words alone.

In some embodiments, posts may be plotted by relevancy (importance score order) which may be determined by:

1) finding all posts with in a view point; and
2) calculating their importance score.

Next, a system may plot them within the view point in their importance score order, and lower importance posts falling under/overlapping higher priority posts are not displayed.

In some embodiments, posts/dots shown on the map are state data shown in minimal form. These are viewable in all zoom levels to show the amount or level of activity in a region. These could be heat maps or other visualization methods showing the amount of total activity in an area.

Further, in some embodiments, a system may track one or more map regions presented to the user. Based on pan and zoom, it transforms the presentation of posts from an aggregated radar zoom to individual bubble UI elements, that pop up, showing state data as individual posts. Posts that are more important appear as higher priority bubble views. Captured and aggregated relevancy data can be used to calculate importance. Further, if a system determines that a user may want to be alerted about another area/location/event, the system may cause a display to move without the user's input. For example, a system may determine what a user may want to see based on a user's past history, similar users, or by using various machine learning techniques that become better as they are used more.

The system aggregates relevancy data to calculate a score (importance score) that determines which post appears first, analogous to the tallest trees getting most of the light.

This symbolization provides greater context using fewer words than Twitter's 140-word limit. Color provides "tagged" information. Animated unfurling of posts may show more data based on screen space. In some embodiments animated bubbles may pop in and out based on screen space, display information, and/or whether an event ended. This combines to enable a system to scale a massive amount of content data on screen at once without becoming overloaded even in a small space such as Manhattan, N.Y.

As can now be seen, what might at first might seem like arbitrary design display, is in fact, carefully developed functionality to fix the hard problem of displaying relevant data from a large set. This functionality allows for a relevant scalable social network on a map.

Without the popping in and out from the minimal dot form, using old style map pins, for example with respect to the amount of content in an area such as Manhattan, would quickly overflow a map causing it to become unreadable. See, for example, FIG. 3B.

Without the ability to tag state data and symbolization using color, users might only be able to use text to convey their feelings. Twitter's 140-character tweets wouldn't work on a map. Further, older aggregation techniques may lose the context of post at higher zoom levels.

All these functionalities in concert (e.g., the bubbles, which are able to appear and disappear based on location, the ability to attach supplemental emotional data using colors, the ability to visualize context using symbolization (emojis)) allow for advantageous transformations of a post, which in another context may simply show up on page 2 of a messaging board.

In one or more embodiments, post data associated with a post may be displayed on at least one client device. Such post data (as discussed above) may include, but is not limited to: a time and/or date, text, images, videos, a shape connoting location information, information about an area of a map, related posts, a symbol associated with a post, an emoji, an emoji bubble, a color, a color associated with an emotion. In one or more embodiments, a post includes post data, which may be displayed on a client device based at least in part on the screen attributes. For example, a particular amount of posts may be shown on the screen of a client device based on the size of the screen (e.g., the display of the client device).

Figure 2:
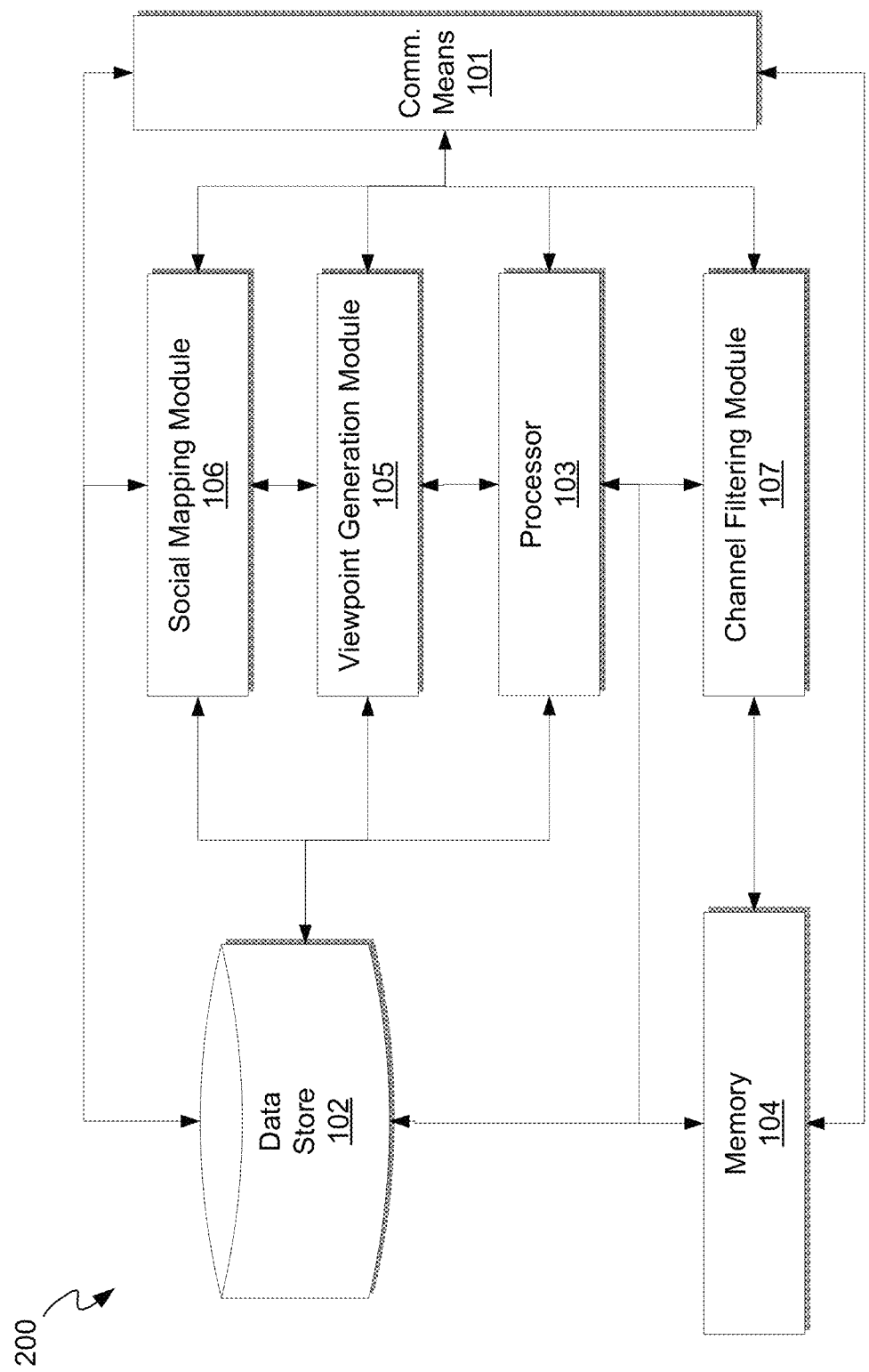

FIG. 2 illustrates system 200, which is similar to system 100 but further includes a channel filtering module 107. Channels are discussed above, and may be used to reduce an amount of posts shown on a display (and may also be referred to as a filter). In one or more embodiments, a channel may include a set of posts (e.g., a channel may filter posts, which may be shown on the display of a client device). Such a set of posts may be related based on attributes of the channel/set of posts (also referred to herein as post attributes), including, but not limited to: a keyword, a tag linked to/associated with the channel/set of posts, a hashtag, a region, a city, a proximity, a common location, an event, a location, a type of location (e.g., a bar, a club, a deli, a sushi restaurant, a stadium, a park), a type of food, a set of social network connections (e.g., selecting a channel may cause posts from a particular set of network users to be displayed on a client device), posts comprising a certain weight (e.g., an amount of upvotes, an amount of downvotes, an aggregate amount of upvotes and downvotes, an amount of comments, an amount of upvotes of comments of a post, a user's preferences, a time associated with comments, and/or a time associated with the post(s). In one embodiment, a post may be based on a channel (e.g., a user may make a post to a certain channel), and the channel may include a set of posts.

FIG. 3A illustrates an example client device 300, according to various embodiments. Client device 300 includes a display 305 including a map, and a plurality of symbols 302, 304, 306, and 308 representing one or more posts, which may be located on the map.

In one or more embodiments, symbol 302 includes a shape including an emoji. The shape included in symbol 302 may include a color which may be representative of an emotion which a user may enter on client device 300. For example, client device 300 may receive input causing it to create a post, and the input may include post data such as a location, symbol, and/or an emotion, all of which may be determined by system 100 and/or entered by a user. In one or more embodiments, a color may be associated with post 302 (e.g., the shape may be colored), and the color may be based on an emotion entered by a user on client device 300.

In one or more embodiments a symbol 304 and 306 may be shown which indicates an emotion. For example, a symbol 304 and 306 may be shown on client device 300 and include an emoji, which may show an indifferent face (e.g., symbol 306) or an unhappy face (e.g., symbol 304).

In one or more embodiments, client device 300 may show on its display 305 an aggregation of posts (e.g., reviews) such as symbol 308. For example, instead of showing a plurality of posts which do not overlap, symbol 308 may indicate the plurality of posts. In one or more embodiments, if a user selects symbol 308 a plurality of at least a portion of reviews may be shown which may be posted by other users of a social network. After a user selects symbol 308, multiple posts may be provided to a user, which may each include at least a portion of a review. In one or more embodiments, a user may view a complete review—which may include images, text, videos, audio, etc.—in response to selecting a review shown after the user has selected the aggregation of posts symbol 308.

In one or more embodiments, text may be shown on display 305. For example, text may be shown indicating an amount of zoom, an amount of votes a post has received, etc. In some embodiments, text may be included in a post and displayed on client device 300. For example, a user may select symbol 306 and text may be shown associated with a post represented by symbol 306. The text may indicate why symbol 306 includes an indifferent emoji. In one or more embodiments, text included in a post may be used to create symbol 306. For instance, text discussing how bad a location is may cause a symbol (e.g., symbol 304) to be associated with a post, wherein the symbol denotes an unhappy emotion (such as an emoji with an unhappy face).

FIG. 3B illustrates an example client device 300, according to various embodiments. As can be seen on example client device 300, and as described throughout the instant disclosure, in some embodiments a plurality of reviews may be shown on a display so much show that the display is of no use. For example, the display shown in FIG. 3B includes so many symbols representing posts that a user cannot sort through them all. As such, systems and methods described herein may cause a display to provide posts in a more digestible manner. For example, posts may be aggregated such that a single symbol may represent a plurality of posts, and thus the posts may not clutter screen real estate. An addition, or as another method, posts may be filtered at least by attributes such that only a subset of posts are shown (e.g., posts may be filtered by a type of restaurant, music playing at a venue, etc.).

In various embodiments, a system can be configured to transform less important content into expanded bubbles at lower zoom levels. Less important content may be displayed/seen less frequently during the aggregation display and may pop up less frequently.

Digestible content can be created in all or most of the viewport options (e.g., view modes and/or configurations). In one or more embodiments, the utilized display is configured to "flex" or transform in display, allowing users to view a summary of the content in a specific area, while also having the ability to see the most relevant individual posts without having to zoom in. The overall effect of the system is to provide an overview of the most important human activity in a country, region, city, or other level.

In various embodiments, as the number of users of the social network grow, the use of static pins may become exponentially less effective. As more users begin using the system, the ability to discern relevant content becomes more difficult. The location-based content platform displays content based on relevancy in relation to the user's viewpoint. As the user's location and relevancy of data change, the system is configured to hide and show Bubbles/posts dynamically in order to filter out content determined to be less relevant to the user.

Our system may provide for a non-obvious solution to this problem by mimicking the behavior of a bubble as seen in nature. The most important defining feature of a displayed bubble is the ability to pop in and out of existence (in other words, in and out of being displayed). Our system is able to use the bubble modality to show (pop in) and hide (pop out) posted social content, based on information gathered from a user's view port. Just as a bubble changes size and shape, these bubbles (e.g., posts) also have the ability to transform and change visual mode of displaying similar variations of the same content in multiple different ways.

FIG. 3C illustrates an example client device 300, according to various embodiments. Client device 300 includes symbols 320, 322, and 324. In one or more embodiments, symbols 320, 322, and 324 may be symbols that are an aggregate of two or more posts. In addition, some posts may be associated with text.

In one or more embodiments, text may be altered. For example, text may be altered by appearing or disappearing on display 305 based on a variety of factors. Text may be displayed on a tab, wherein the tab is associated with a symbol (e.g., a tab may be emerging from a symbol (also referred to as a graphical symbol)). Altering text may include displaying additional text, or less text. In one or more embodiments, text may be altered based on an input received by a client device such as where a tab is selected. For example, text shown in FIG. 3C may correspond with symbol 320, and may show more or less text, at least a portion of which says, "GREAT BLUES MUSIC!"

Moreover, text may include an indication of a value associated with an attribute. In one or more embodiments, various symbols or other representations of posts may be shown based on values (e.g., rankings) associated with particular attributes. For example, a user may filter posts/aggregated posts (which may be used interchangeably herein with creating and/or viewing a channel). In one or more examples, as shown in example FIG. 3C, posts may be filtered by nightlife. Various attributes, such as drink specials, salsa dancing, and blues music may be attributes that are filtered. For example, here, Broadway shows may be filtered out (and may have been shown on the cluttered map in FIG. 3B. Posts, symbols, etc. may be shown over others based on rankings/values associated with the attributes. For example, many dancing symbols 322 may be shown, and text corresponding to the dancing symbols may show that the average salsa dancer at one or more locations has a skill level of 8. Thus, in some embodiments, this set of posts/aggregated symbol may be shown rather than one in another part of town. Similarly, an attribute such as drink specials may be associated with an ambivalent face as shown by symbol 324 and its corresponding text. In some embodiments, a plurality of attributes corresponding with one or more locations may correspond to a plurality of rankings, all of which may be used to determine how many, a type of, and/or where a symbol/post may be shown on a map, as described herein.

In one or more embodiments, instead of rankings corresponding with attributes corresponding to a post, or in combination with rankings corresponding to attributes associated with a post, in one or more embodiments a post itself may be based on a relevance number. A relevance number may be based on various attributes including, but not limited to: a time that a post was recorded, a number of votes received by a post, a number of positive/up votes received by a post, a number of negative/down votes received by a post, an aggregation of a number of positive/up and negative/down votes received by a post, a number of comments received by a post (e.g., associated with a post), a number of positive/up votes received by comments associated with a post, a time of at least one comment, and/or a comment relevance (e.g., whether the comment has something to do with the post, whether the comment was posted by user's connection within a social network).

Figure 3D:
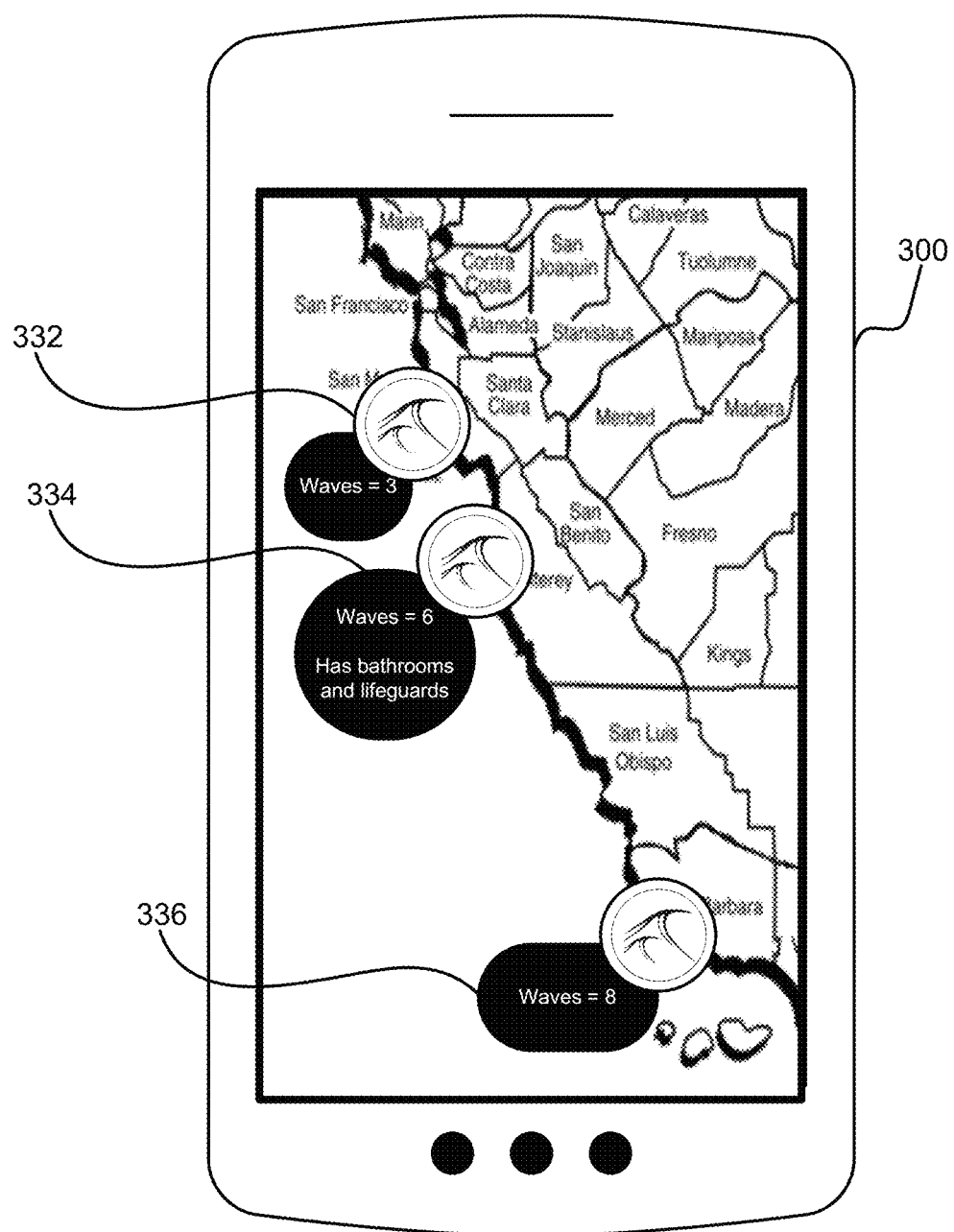

FIG. 3D illustrates an example client device 300, according to various embodiments. As with 3C, attributes of symbols 332, 334, and 336 may be shown based on rankings associated with their attributes. For example, symbol 336 may be shown based on an attribute the quality of waves associated with beach/symbol 336. In one or more embodiments, information corresponding with an attribute of a post or symbol may be received from a system from a canonical (e.g., third-party source). For example, information from a beach information website may provide a system with the quality of waves. Similarly, in some embodiments, information provided by a website such as Yelp!™ may be used to determine a value of an attribute corresponding to a location/post. As another example, an RSS feed (e.g., from a twitter account) may be used to rank attributes, create posts, and/or determine which posts/symbols will be displayed on a client device. In some embodiments, a post/symbol such as 332 may not be shown because its value associated with waves is only 3. However, it may be shown—despite its wave ranking of 3—based on rankings provided by one or more users. For example, a combination of the rankings of attributes of a post (e.g., the quality of waves, wherein waves is an attribute of a location) may be combined with rankings of a post itself (e.g., a beach in Santa Cruz where people are surfing).

In some embodiments, a cumulative ranking of a post/group of posts may be based on rankings of multiple attributes. For example, a post/symbol 334 of a beach in Monterey may indicate that the quality of waves is a 6, and that the beach has bathrooms and lifeguards such that children may go into the water there. In one or more embodiments, the cleanliness of the bathrooms may be ranked and/or the quality of the waves—which may all be included in the overall ranking of the location (e.g., whether it may be shown on a particular map created by one or more users).

As described throughout this disclosure, a beach in Santa Cruz may be a location about which a post may be made. Many posts may be aggregated into a single post such that a map is not cluttered. A post and/or aggregated post (which may be represented by a symbol) may have attributes associated with it/corresponding to it (e.g., waves). In one or more or more embodiments, the attributes may have their own rankings, which may affect which or whether a post/symbol is shown on a map on a client device. An example of an attribute with its own ranking would be an attribute such as waves, which are ranked by a quality (e.g., surfability, size, etc.).

In one or more embodiments, the system can be configured to determine relevancy of a posting user based on one or more signals including, but not limited to: whether a user is following another user (e.g., whether connected, or simply being updated when a person posts (e.g., unilateral following)); whether a user is subscribed to a map channel which is also subscribed to by a posting user; and/or whether the viewing user share interest with the posting user; whether the viewing user shares demographic traits with the posting user.

In one or more embodiments, according to the derived importance and/or relevancy scores, the system can be configured to do one or more of the following including, but not limited to: showing the content more prominently on the map; expand or display the content at higher zoom levels; expand or display the content with more frequency either individually or in aggregate; and/or expand or Display more content of that type.

Relevancy scores/cues may be a weighted aggregate comprising, without limitation: Comment Score, Vote Score, and/or Time Score. A Comment Score may be a number determined by the number of comments that a post has and how recent each comment was posted. Older comments may have a lower score, more recent comments may have a higher score. A Vote Score may be a number determined by the number of total votes and up votes that the post has received, weighted by how recent those votes took place. In some embodiments, a Time Score may be a number weighted by how old the post is, older posts have a lower score. By using the aggregated Relevancy score/values, it may be possible to surface the most relevant and popular content.

Further, in some embodiments some activities or locations that a user is interested in may be weighted differently than others. For example, if a user likes Mexican food they may weight Mexican food 3 times higher than Korean BBQ. As such, if a particular Mexican food restaurant has a rating/score of 3, and a Korean BBQ restaurant has a rating/score of 7, then the Mexican food restaurant would have a total weighting of 9 (e.g., 3×3) making it more relevant/important to the user who likes Mexican food.

In some embodiments, an ephemerality system (e.g., a system that may add or remove posts based at least in part on a period of time) may provide user control over post content ephemerality on a map-based social network. This has multiple advantages such as providing a more accurate representation of "what's going on now", and giving a real time feel to the map. Further, disappearing posts may add space so map content doesn't fill the screen, thereby allowing the system to scale in user numbers and post without overflowing their screen.

In one embodiment, users are given the ability to select how long posts—or certain types of posts (e.g., based on a channel)—remain on a map. A duration of a post can range from less than seconds, seconds, minutes, hours, days, weeks, months, years, or all the way to infinite duration.

In one embodiment, a history scrubber allows users to rewind back into time and see the map as it existed some place in the past. This gives the benefits of "real time" posting (what's happening now) while providing the ability to see historical information (what was happening then). This way, a real-time overview of human events is provided while not overflowing the map with old social postings. This can be configured to work analogously to moving forward and back on a YouTube video, entering date information, using incremental time controls, having versions of maps, and so on.

In some embodiments, a user may see what happened on a previous weekend, such as where their friends went and/or what types of posts happened at different places. Such functionality may be combined with a third-party source such that a user can have multiple sources of information to make a more informed decision regarding what play they would like to see, where they would like to go, what they would like to eat, who they would like to spend their time with, etc.

It is contemplated that in some embodiments a user may tag other users, such that the user knows to stay away from a certain location, or go to a certain location. In some embodiments a user may also erase posts they made or not allow other users to see where they were or what they did at a previous point in time.

Figure 3E:
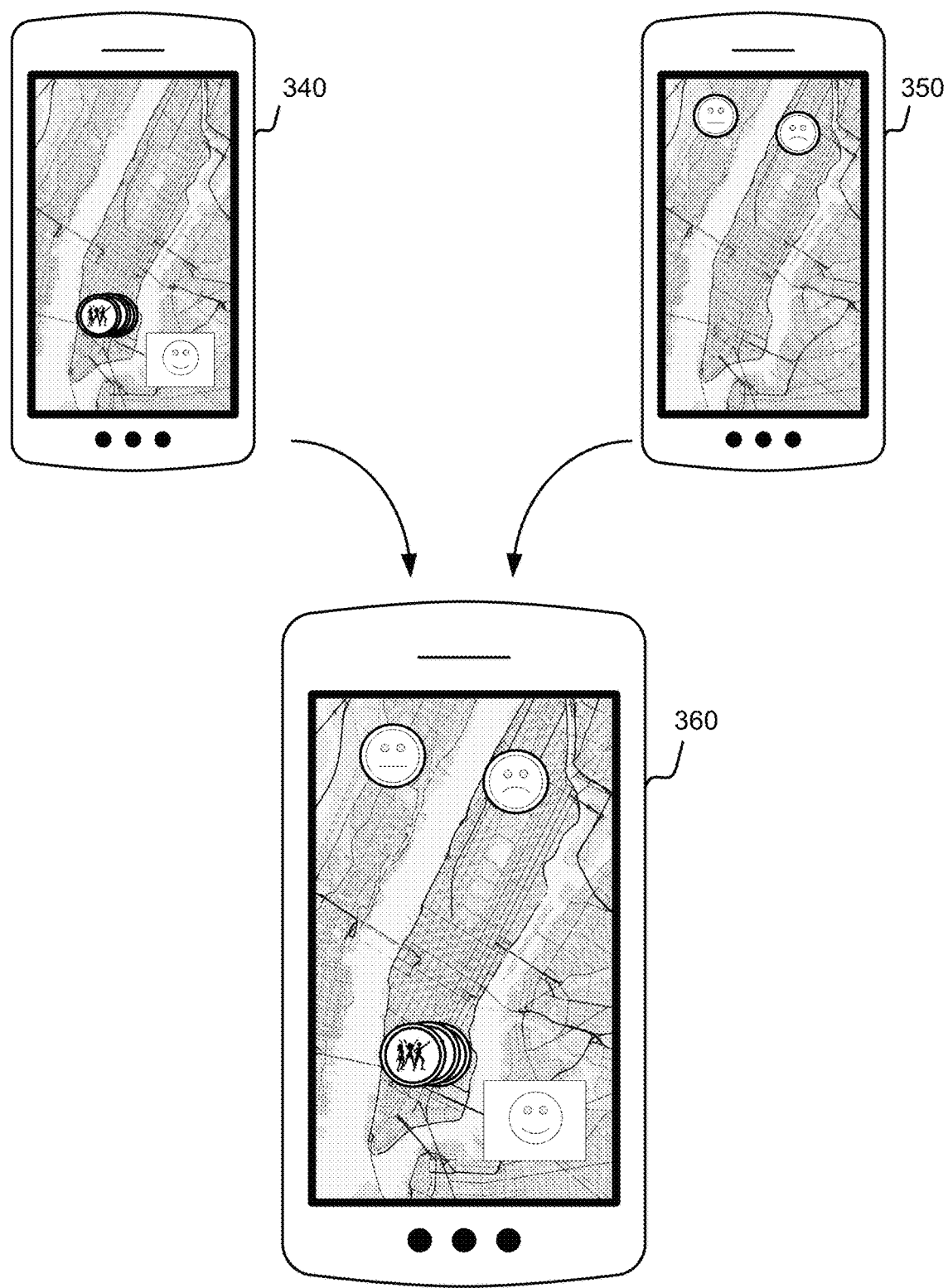

FIG. 3E shows an example of multiple maps combined into one. For example, a map shown on device 340 may be a first user's map which may be filtered by locations above a particular point. A map shown on device 350 may be filtered to show locations below a particular point. In one or more embodiments described herein, a user (e.g., a user of client device 360) may select multiple filtered maps (e.g., the maps shown on devices 340 and 350, which may have been created by strangers and/or connections) and combine those maps to be shown on their own screen. In one or more embodiments, a discussion about channels included herein may be applied to such an embodiment, since in some embodiments channels and filters may be used interchangeably to described substantially the same functionality.

In some embodiments, a map may include every post and/or symbols representing every post made (e.g., to a social network). Users may configure their maps however they like. As discussed herein, a user may select a shape and size of a map shown on their mobile device, as well as the types posts shown by using filters/channels. In some embodiments, such as those shown in FIG. 3E, a user may cause symbols/posts from another user's system to be shown on their device (e.g., map). Many maps from many users may be shown on a user's device in a similar fashion (e.g., the information shown on devices 340 and 350 may be shown on device 360). In some embodiments, a user may import all types of information onto their system. For example, a user may import one, two, three, or ten filtered maps (e.g., maps including posts wherein the posts are shown based on a location, attribute, ranking, etc.) onto their own device (and these filtered maps may be shown on their device). In some embodiments, a user may filter the imported filtered posts/maps/symbols such that their screen is not cluttered and/or they see the types of posts/symbols that they would like to see. As with any post/symbol/attribute, they may be ranked and/or text may be included and/or altered (e.g., to show more or less text as in FIG. 3C) based on preferences of a user. In one or more embodiments, a combination of maps may be referred to as an atlas.

Figure 4:
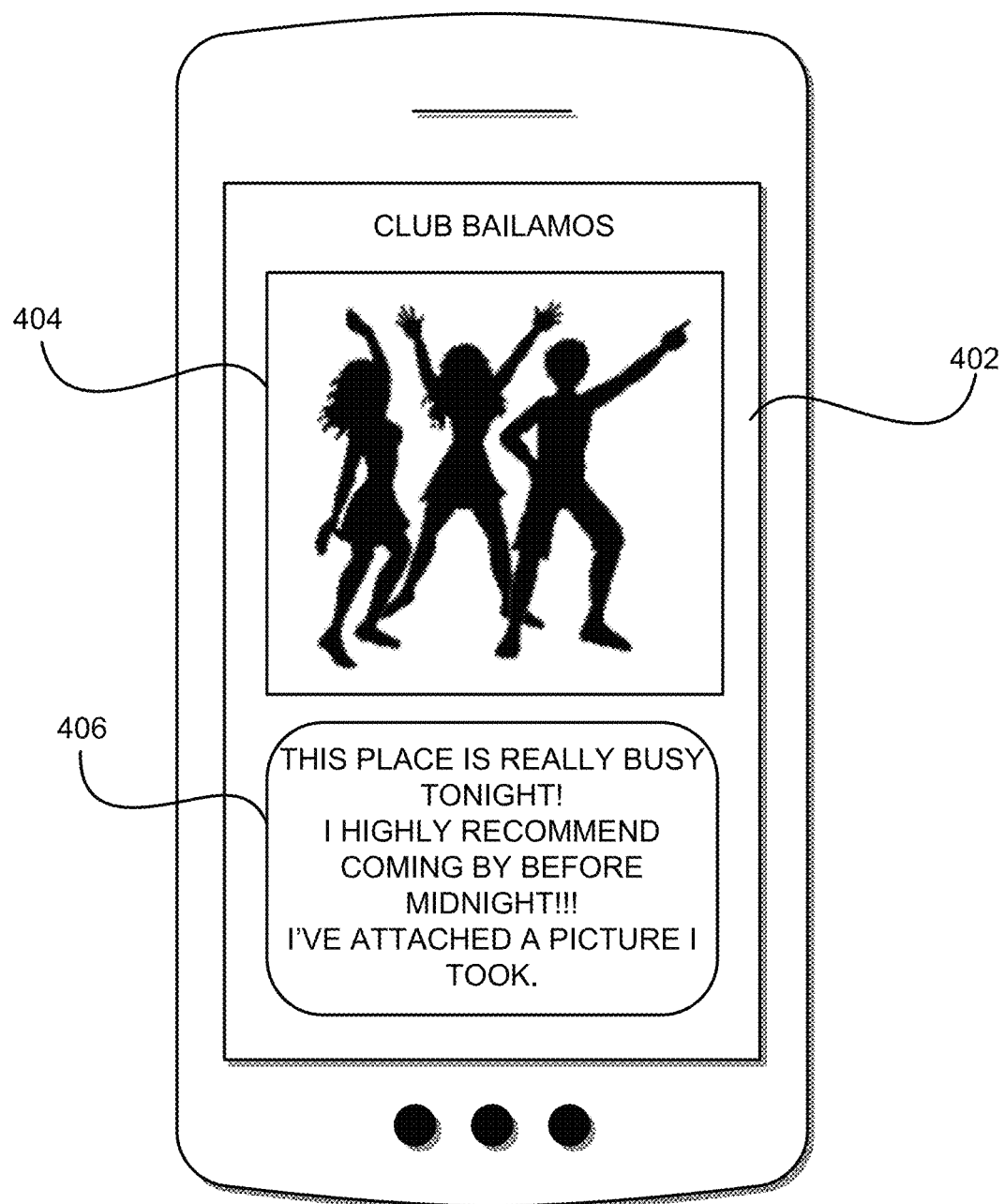
FIG. 4 illustrates an exemplary post, in accordance with one or more embodiments of the invention.

FIG. 4 illustrates an exemplary depiction of systems described herein, in accordance with one or more embodiments of the invention. FIG. 4 shows a review 402. Review 402 includes an image 404 and text 408. The review 402 may appear in response to device input such as the pressing of an emoji, in response to a request for a review, in response to typing in the name of a location, etc. In some embodiments users may view many reviews by swiping a screen in a particular direction, searching for a connection's reviews, searching for reviews within the previous 20 minutes, etc.

Figure 5:
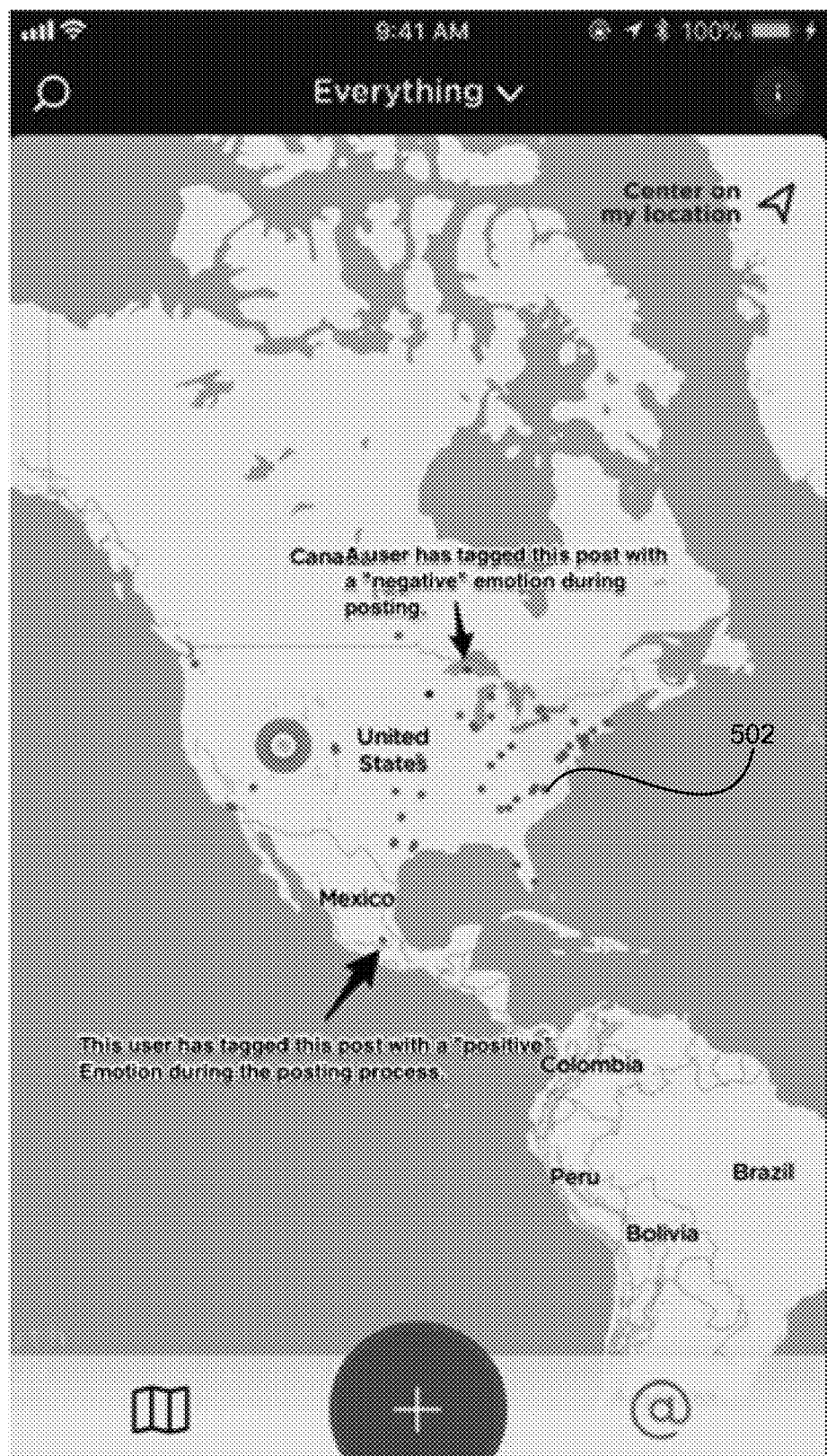
FIG. 5-6 illustrate exemplary client devices, in accordance with one or more embodiments of the invention.

FIG. 5 shows posts 502 displayed in their minimal form, even in this form the "emotional" tags are still shown giving a user a high-level overview of the nature of posted information. However, as a user zooms in closer to a post they may various posts may become more descriptive, rather than being a simple dot on a map. If a user still does not know what they would like to do and/or see, they may post questions for other users to answer.

Figure 6:

For example, FIG. 6 shows that a user has posted a question 602 and nearby users are notified of questions posted to the map. In this example, the color is shown as grey denoting a "question" post.

In one or more embodiments, the social mapping module includes functionality to receive, from a client device, a request for one or more social media posts. For example, the social mapping module 106 may receive a request from the client device 300. The request may include screen attribute information about the display 305 of the client device. For example, the size of the display 305, the resolution of the display 305, areas of a map displayed on the display 305, etc. The request may include geographic location information, for example, identifying a geographic location of the client device 300 or an area/specific location navigated to where the client device 300 is not currently located. The request may include identification of a requesting account of the social network, for example, the account associated with a user of the client device 300.

In one or more embodiments, the social mapping module includes functionality to identify a set of temporally recent social media posts based on the screen attribute information and the geographic location information. For example, the social mapping module may only identify social media posts that have been posted within the most recent 15 minutes, 30 minutes, 45 minutes, 1 hour, 2 hours, 3 hours, 12 hours, and 24 hours. In addition, the social mapping module may only identify social media posts that are within a proximity of distance from the location included in the geographic location information, and/or within a map view specified by the screen attribute information.

In one or more embodiments, the request further includes a category indication. For example, the category (or channel) may be restaurants, bars, sports venues, etc. Identifying the set of temporally recent social media posts may be based on the category indication. In other words, the identification may partially or completely exclude social media posts that are not included in the indicated category.

In one or more embodiments, the social mapping module includes functionality to apply grouping criteria to the set of social media posts to generate a suggested group. For example, the social mapping module may further filter the social media posts to determine a suggested group of social media posts that may be later provided to the client device. Accordingly, the suggested group may be a subset of the set of social media posts.

In one or more embodiments, applying the grouping criteria includes ranking each social media post of the set of social media posts according to a customized score for each social media post. The customized score may be based on a set of preference factors (corresponding to the requesting account) that are applied to a general score of each social media post. For example, each social media post may include a general score that is not specific to any particular user or preference. The general score may be based on various factors, like general popularity. One or more preference factors may define preferences of a particular account. Such preference factors may be applied to the general score of a social media post to arrive at a customized score for the social media post. In other words, the preference factors may be used to determine a weighted version of the general score, resulting in the customized score that is specific to the particular. In the absence of a preference factor, the unweighted general score may be used.

A preference factor may be implicit or explicit. For example, a preference factor may be determined based on an account's past behavior or account attributes (e.g., demographics like age, sex, gender, etc.), or may be based on explicit indications made by the account.

In one or more embodiments, the social mapping module includes functionality to rank each social media post based on a distance between a geographic location corresponding with the social media post and the geographic location information. For example, the social media post may correspond with a location such as a salsa club, and the ranking may be based on the distance of that salsa club from the location identified by the geographic location information.

In one or more embodiments, the social mapping module includes functionality to select, based the ranking, the subset of the set of social media posts for inclusion in the suggested group. The selecting may involve excluding at least one social media post of the set of social media posts from inclusion in the suggested group based on the ranking. In one or more embodiments, the social mapping module includes functionality to provide, in response to the request, the suggested group for display by the client device 300.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

Figure 7:
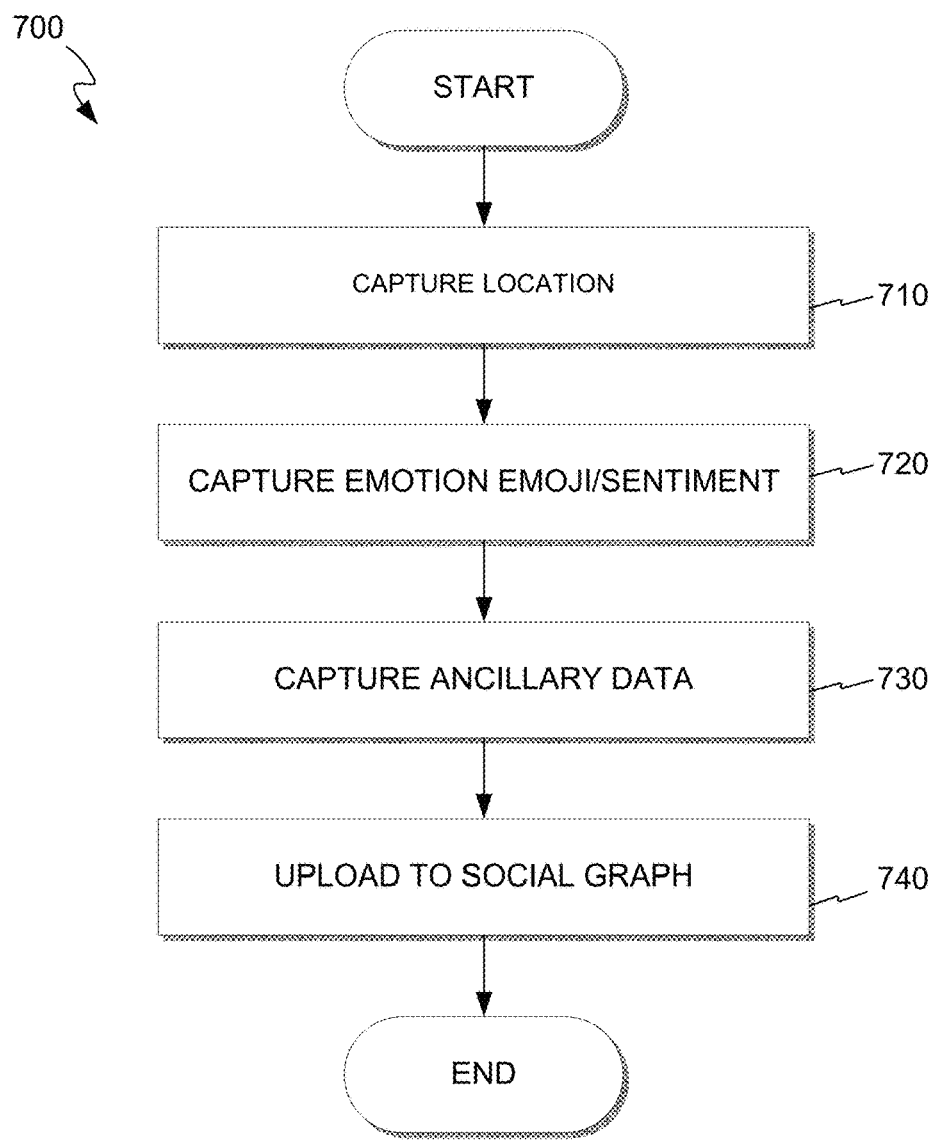
FIGS. 7-9 illustrate flowcharts of exemplary processes, in accordance with one or more embodiments of the invention.

FIG. 7 illustrates a flow chart 700 wherein Emotive Social Data records a person's emotional state and geographical location along with but optionally a short message, a video, or photos, and uploads the collection to a social graph to be viewed by other people. We can call these emotive social records posts.

At step 710 a location is captured. A client device may capture a location of the Person creating the post or another location on earth or any other planet that we have geographical data of.

At step 720, and emotion emoji/sentiment is captured. For example, a client device may capture a person's social state. Social state data includes but is not limited to their general sentiment (good, bad, neutral), a short description of their sentiment, An Emoji of their sentiment.

At step 730, ancillary data may be captured by a client device. Ancillary data includes but is not limited to: photos, video, text, audio, metadata about a photo, video, and/or audio, and/or or live broadcasting of ancillary data.

At step 140, this social data may be uploaded to the social graph, which is a collection of all social data. As more users perform these functions, the more robust a map becomes, and the greater the likelihood a user will find what they are looking for—even if they didn't know it existed.

Figure 8:
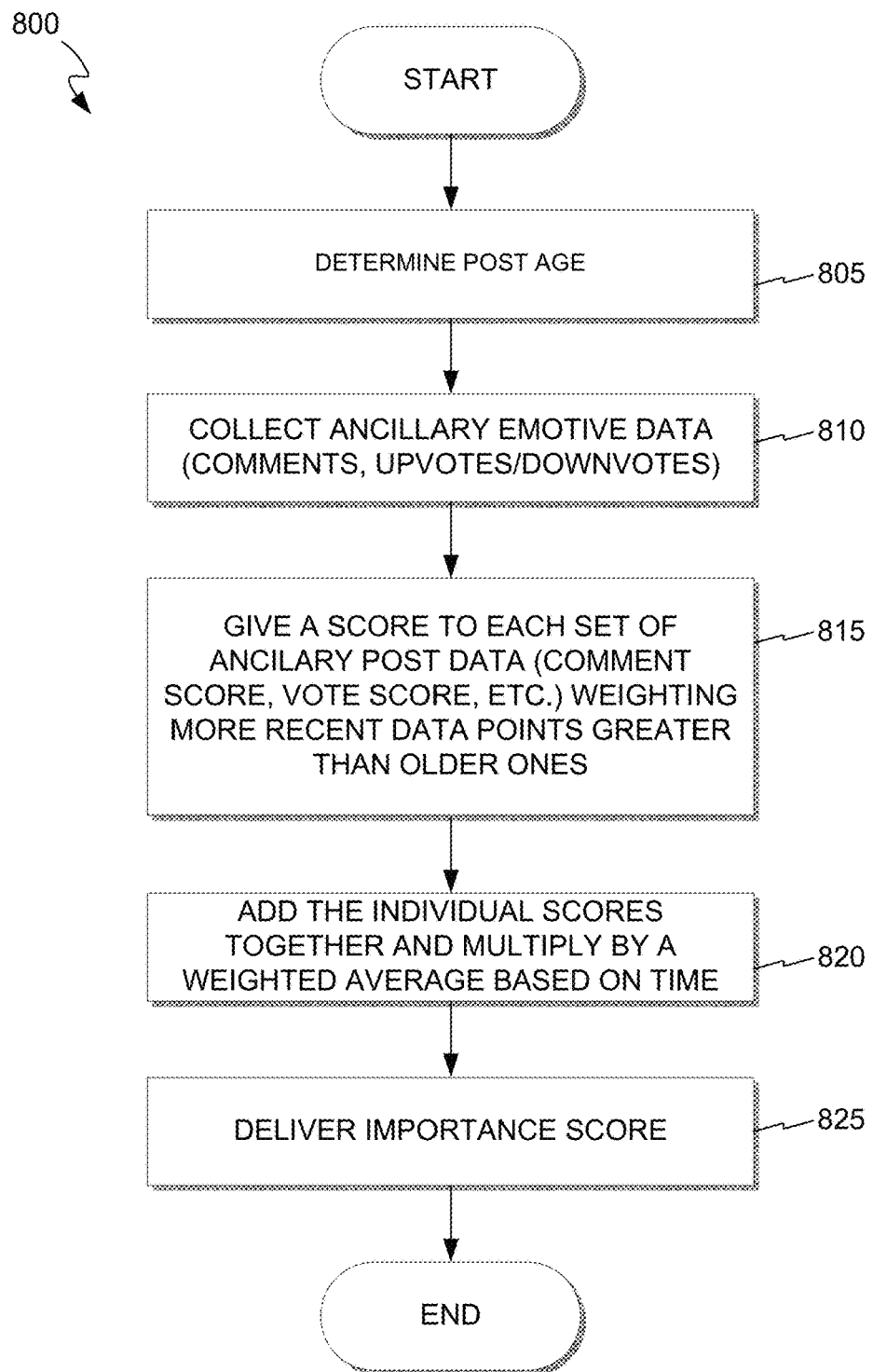

FIG. 8 illustrates a flow chart 800 which can calculate the value of a post (e.g., its importance score), in accordance with some embodiments. At step 805, a post age is determined. This may be used to determine whether the activities described in the post are still occurring, or if they have ended. In some embodiments, the older the post the less important it is. However, in other embodiments a post that has lasted the test of time (e.g., been shown on one or more user's devices for a threshold amount of time), then it may have a higher value.

At step 810, ancillary emotive post data may be collected (e.g., comments, upvotes/downvotes). Ancillary emotive post data may help to determine importance, for example comments could be added to a post. The more comments a post has the more important it is. How recent comments are may also impact an importance. Other emotive patterns such as: up voting/down voting of a post, the number of likes or favorites the post has received.

At step 815, a score may be given to each set of ancillary post data (comment score, vote score, etc. . . . ) weighting more recent data points greater than older ones. A system may then apply a score to each ancillary data point and weights it according to the design of the social graph designers. For example, if the designers of the social graph value positive ancillary social emotive data then positive data will be weighted higher than negative data.

At step 820, individual scores may be added together and multiplied by a weighted average based on time, for example (although they could be weighted on a channel, an emotion, a user, a location, etc.).

At step 825, the social graph designers (e.g., one or more users) may weigh the impact of each previously discussed social emotive data score and combine them together to deliver an overall importance score.

Figure 9:
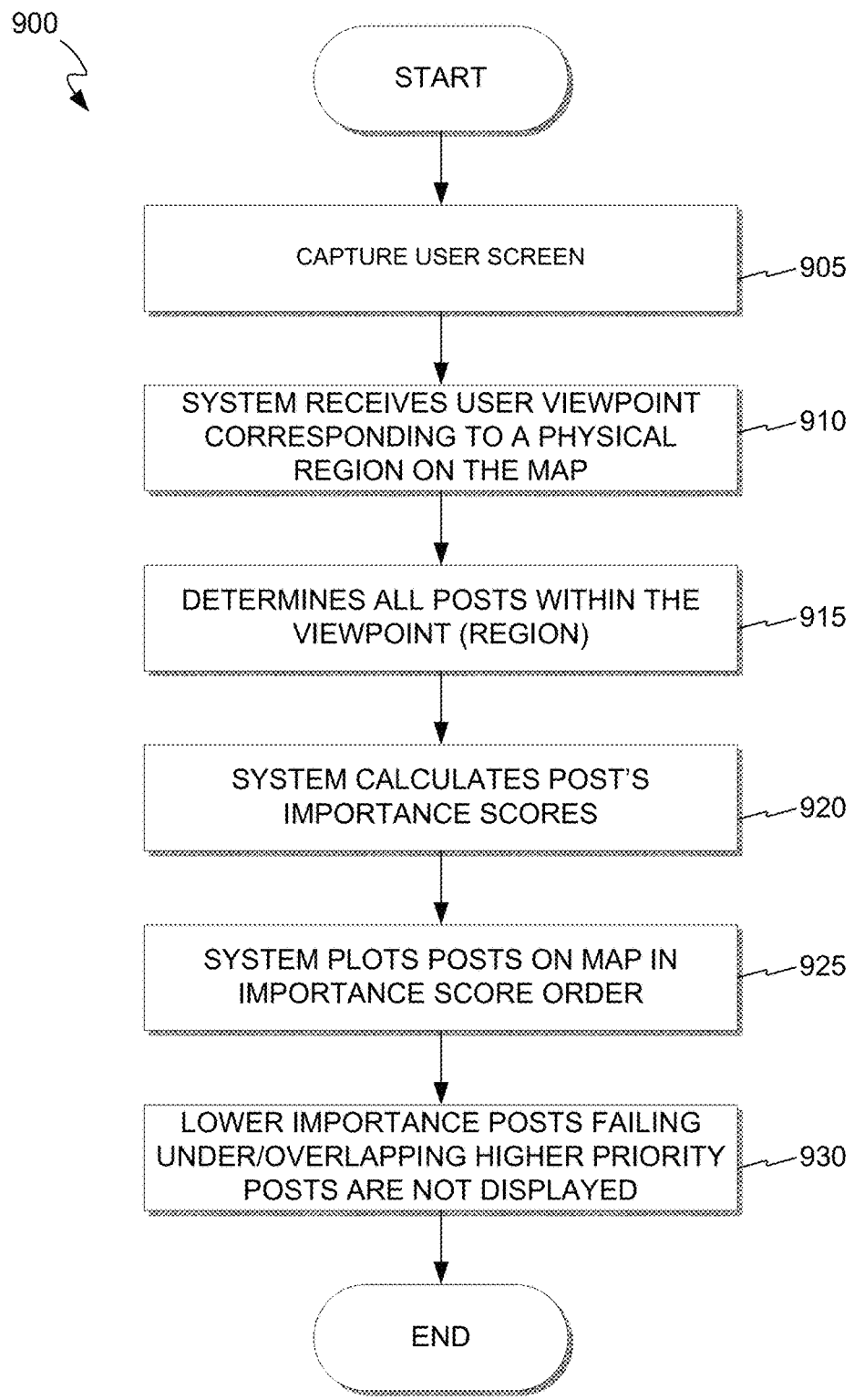

FIG. 9 illustrates a flow chart 900 that may determine relevance scores, in accordance with some embodiments. At step 905, a system may capture the user's screen data, which may influence what is shown on the map. For example, if a user is browsing toys on Amazon™, toy stores may be more prominent on the user's map.

At step 910, a system may receive a user's viewpoint which may correspond to a physical region on the map. This may correspond to an actual real-life piece of the map. E.g., a geographic region that falls within 3 or more geographic coordinates. Although, it is contemplated that four or more coordinates may be used to create an area.

At step 915, a system may determine all posts within a region. For example, a system may determine all of the posts within the region that we previously obtained by the user. In some cases, a user may be able to view posts that were made during a particular period of time such as the previous weekend. These posts may be emotive social data shared by a user into the social graph.

At step 920, a system calculates post's Importance Scores (or value). The system then calculates, or receives the already calculated Importance Score.

At step 925, a system may plot posts on a map based on their values, as described throughout the instant application. The system may order the posts based on their importance score in descending order, with the highest importance score coming first. These are then plotted on the map in order. At step 930, lower importance posts may fall under/overlapping higher priority posts are not displayed.

As each post is placed on the map there is a chance that they may overlap. A system may prevent this by not placing a priority post on the map on top of another priority post. If a post would fall on top of another post of higher importance, it is instead placed below it using a smaller less priority view, such as a dot.

FIGS. 7-9 illustrate flowcharts of various methods for functionality associated with the example location-based content platform of FIG. 1. While the various steps in the flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, wearables like a smart watch, personal digital assistant, tablet computer, or other mobile device), desktop computers, smart televisions, smart home appliances, electronic kiosk stands, smart automobiles, servers, blades in a server chassis, or any other type of computing device(s) that include at least the minimum processing power, memory, and input and output device(s) to perform one or more embodiments.

Figure 10:
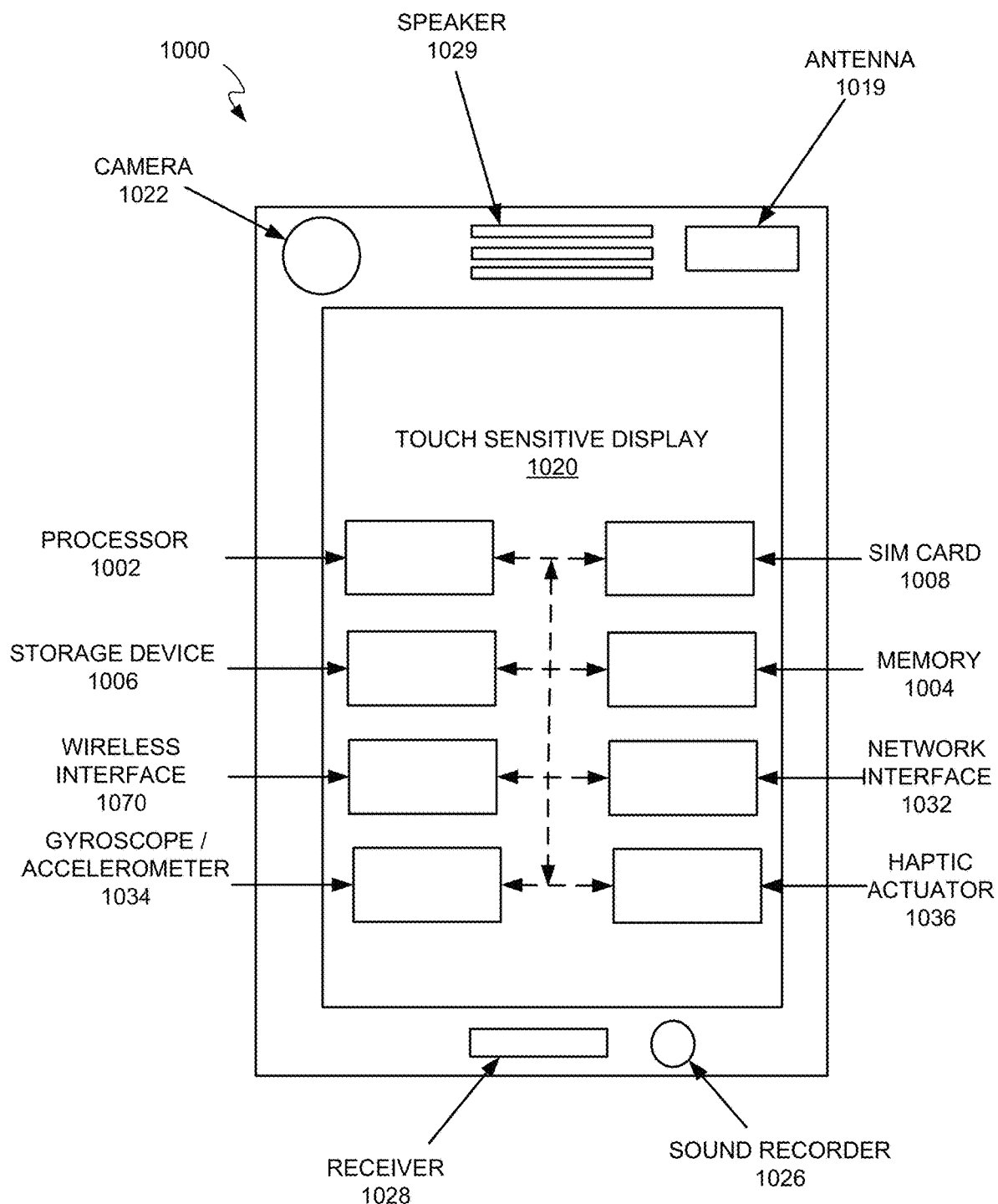
FIG. 10 illustrates an exemplary block diagram of a client device, in accordance with one or more embodiments of the invention.

Embodiments of the invention may be implemented on various mobile or non-mobile computing devices, regardless of the platform being used. In one or more embodiments of the invention, as depicted in FIG. 10, a mobile device 1000 can be used to create, receive, and/or transmit one or more sensory memes and/or, more generally, to implement one or more of the user interface related functionality disclosed herein. The mobile device 1000 may include any portable device that provides a user interface. Examples of mobile devices may include, but are not limited to, cellular phones, personal digital assistants, personal communicators, tablet computers, smartphones, or any other computing device. The mobile device 1000 can include one or more processor(s) 1002, memory 1004 (e.g., RAM, cache memory, flash memory, etc.), a storage device 1006 (e.g., a hard disk, a solid state drive, an optical drive such as a compact disk drive or digital video disk (DVD) drive, a flash memory stick, etc.), a subscriber identification module (SIM) card 708, a speaker 1029, an antenna 1019, a wireless interface 1070, a network interface 1032 and numerous other elements and functionalities typical of mobile devices (not shown).

The mobile device 1000 may include input means and output means, such as the keyboard, the receiver 1028, and/or the touch sensitive display device (e.g., a touch liquid crystal display screen) 1020, which permits a user to perform gestures (e.g., drag, swipe, multi-touch, select, press and hold, etc.) and enter/display keystrokes (including numeric, alphabetic, and other characters, images, or other media types). Other input devices may include a camera 1022, a sound recorder 1026, and/or other data recording mechanism. Those skilled in the art will appreciate that these input and output means may take other forms now known or later developed. Using embodiments of the present invention, a consumer may initiate create, edit, and/or share a video vignette using the mobile device 1000.

The form factor and functionality of the mobile device 1000 can vary in accordance with various embodiments of the invention. For example, as discussed above, the mobile device 1000 can include one or more sensory devices (e.g., wearable electronics, biometric, optical, acoustic, mechanical, electrical, etc.) or any combination of devices configured to perform some or all of the functionality described with regard to FIGS. 1 and 2.

The mobile device 1000 may be connected to a network (e.g., a local area network (LAN), a wide area network (WAN) such as the Internet, or any other similar type of network) via the antenna 1019, wireless interface 1030, and/or network interface 1032. In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (1000) with a mobile device identifier of the mobile device 1000.

In one or more embodiments of the invention, the network connection may be facilitated by a hardwired or other similar connection using the network interface 1032. For example, the network connection may involve a hardwire connection or short-range wireless connectivity technology with a second mobile device, a printing mechanism, a scanner, or a recording system.

In one or more embodiments of the invention, the gyroscope/accelerometer 1034 and haptic actuator 1036 are examples of sensory devices embedded within the mobile device 1000 and usable in the creation and playback of one or more sensory memes.

Figure 11:
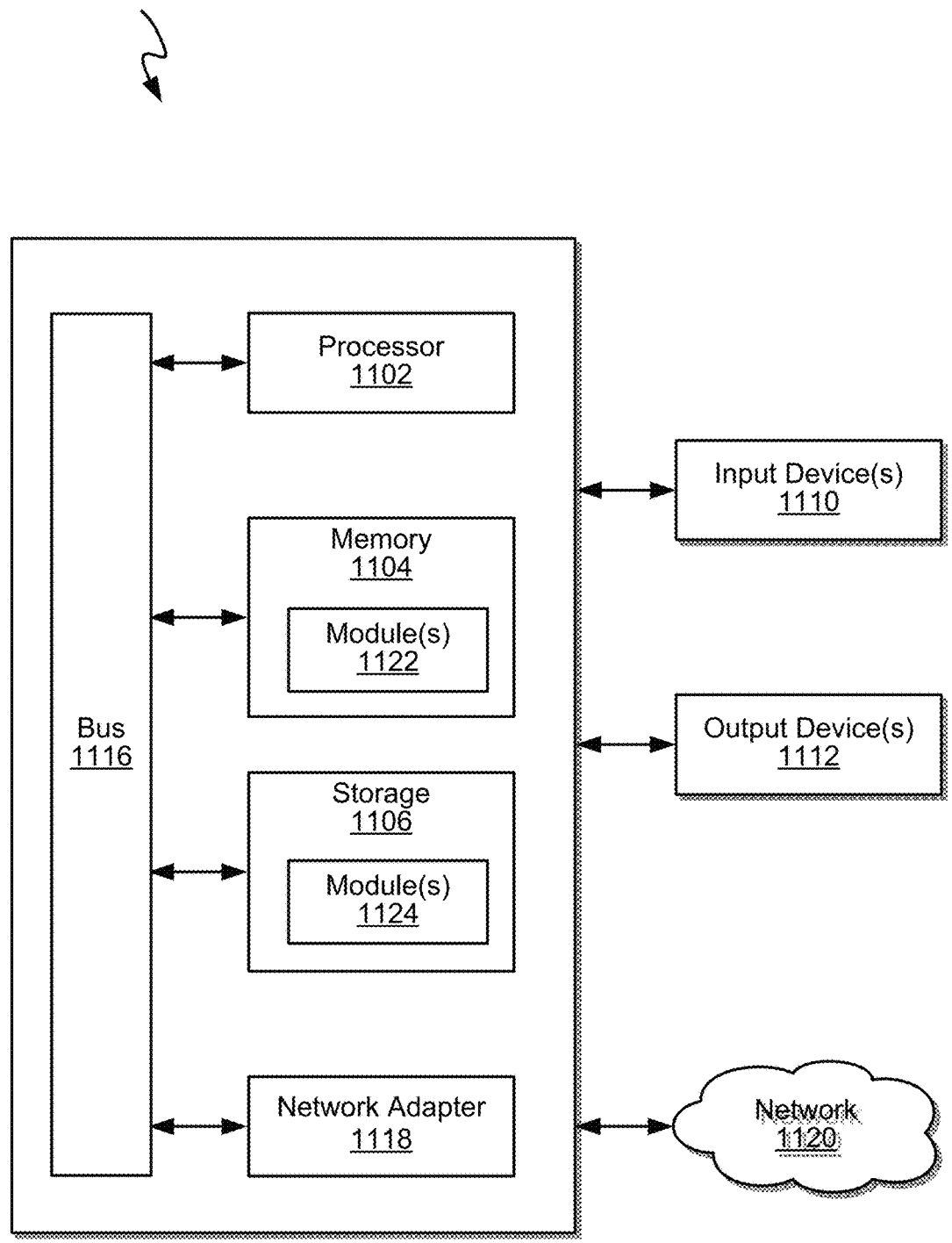
FIG. 11 illustrates an exemplary block diagram of a computing system, in accordance with one or more embodiments of the invention.

FIG. 11 illustrates a computing system 1100 which may include one or more computer processor(s) 1102, associated memory 1104 (e.g., random access memory (RAM), cache memory, flash memory, etc.), one or more storage device(s) 1106 (e.g., a hard disk, an optical drive such as a compact disk (CD) drive or digital versatile disk (DVD) drive, a flash memory stick, etc.), and numerous other elements and functionalities. The computer processor(s) 1102 may be an integrated circuit for processing instructions. For example, the computer processor(s) may be one or more cores or micro-cores of a processor. The computing system 1100 may also include one or more input device(s) 1110, such as a touchscreen, keyboard, mouse, microphone, touchpad, electronic pen, or any other type of input device. Further, the computing system 1100 may include one or more output device(s) 1112, such as a screen (e.g., a liquid crystal display (LCD), a plasma display, touchscreen, cathode ray tube (CRT) monitor, projector, or other display device), a printer, external storage, or any other output device. The computing system 1100 may be connected to a network 1120 (e.g., a local area network (LAN), a wide area network (WAN) such as the Internet, mobile network, or any other type of network) via a network interface connection 1118. The input and output device(s) may be locally or remotely connected (e.g., via the network 1120) to the computer processor(s) 1102, memory 1104, and storage device(s) 1106.

One or more elements of the aforementioned computing system 1106 may be located at a remote location and connected to the other elements over a network 1114. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1 and 2) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1 and 2) and/or flowcharts (e.g., FIGS. 7-9). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for providing location information on a social network, comprising:
 a computer processor; and
 a client device module executing on the computer processor and configured to enable the computer processor to:
  send, to a social mapping system, a request for one or more social media posts, wherein the request includes screen attribute information about a display of a client device specifying a geographic map region displayed on the client device, geographic location information, and an identification of a requesting account of the social network;
  receive, in response to the request, a suggested group for display by the client device, wherein the social mapping system:
   identifies a set of temporally recent social media posts based on the screen attribute information and the geographic location information;
   applies two sets of grouping criteria to the set of social media posts to generate a suggested group, wherein:
    the suggested group is a subset of the set of social media posts, and
    applying the two sets of grouping criteria comprises:
     generating a combined ranking based on:
      ranking each social media post of the set of social media posts according to a first customized score for each social media post, wherein the first customized score is based on a first set of preference factors, corresponding to the requesting account, applied to a general score of each social media post, and
      ranking each social media post of the set of social media posts according to a second customized score for each social media post, wherein the second customized score is based on a second set of preference factors, corresponding to the requesting account, applied to the general score of each social media post, and selecting, based on the combined ranking, the subset of the set of social media posts for inclusion in the suggested group, wherein the selecting comprises excluding at least one social media post of the set of social media posts from inclusion in the suggested group based on the combined ranking; and display, by the client device, the suggested group.

2. The system of claim 1, wherein the geographic location information specifies a location of the client device.

3. The system of claim 1, wherein ranking each social media post of the set of social media posts according to a first customized score for each social media post further comprises:

ranking each social media post based on a distance between a geographic location corresponding with the social media post and the geographic location information.

4. The system of claim 1, wherein the set of preference factors are selected based on past behavior of the requesting account.

5. The system of claim 1, wherein ranking each social media post further comprises using a customized score equal to the general score when no applicable preference factor exists for a social media post.

6. The system of claim 1, wherein the general score of each social media post is based on at least one selected from a group consisting of user upvotes, user downvotes, total number of user votes, recency of user votes, user reviews, user-submitted emotional states, a number of user location check-ins, and geographic proximity to other popular venues.

7. The system of claim 1, wherein:

the request further includes a category indication, and identifying the set of temporally recent social media posts is further based on the category indication.

8. The system of claim 7, wherein the category indication comprises at least one selected from a group consisting of a size of a venue, a type of music played, a type of food served, connections of a profile included in the social network, types of connections of a profile included in the social network, a time of one or more social media posts, activities associated with one or more social media posts, an amount of one or more social media posts within a particular amount of time.

9. The system of claim 1, wherein the set of temporally recent social media posts comprise at least one selected from a group consisting of social media posts posted within the most recent 15 minutes, 30 minutes, 45 minutes, 1 hour, 2 hours, 3 hours, 12 hours, and 24 hours.

10. A method for providing location information on a social network, comprising:

sending, to a social mapping system, a request for one or more social media posts, wherein the request includes screen attribute information about a display of a client device specifying a geographic map region displayed on the client device, geographic location information, and an identification of a requesting account of the social network;

receiving, in response to the request, a suggested group for display by the client device, wherein the social mapping system:

identifies a set of temporally recent social media posts based on the screen attribute information and the geographic location information;

applies two sets of grouping criteria to the set of social media posts to generate a suggested group, wherein:

the suggested group is a subset of the set of social media posts, and applying the two sets of grouping criteria comprises:

generating a combined ranking based on:

ranking each social media post of the set of social media posts according to a first customized score for each social media post, wherein the first customized score is based on a set of preference factors, corresponding to the requesting account, applied to a general score of each social media post, and ranking each social media post of the set of social media posts according to a second customized score for each social media post, wherein the second customized score is based on a second set of preference factors, corresponding to the requesting account, applied to the general score of each social media post, and selecting, based on the combined ranking, the subset of the set of social media posts for inclusion in the suggested group, wherein the selecting comprises excluding at least one social media post of the set of social media posts from inclusion in the suggested group based on the combined ranking; and displaying, by the client device, the suggested group.

11. The method of claim 10, wherein the set of temporally recent social media posts are removed from the suggested group for display based at least in part on a closing time of a business corresponding to the social media posts.

12. The method of claim 10, wherein ranking each social media post of the set of social media posts according to a first customized score for each social media post further comprises:

ranking each social media post based on a distance between a geographic location corresponding with the social media post and the geographic location information.

13. The method of claim 10, wherein the set of preference factors are selected based on past behavior of the requesting account.

14. The method of claim 10, wherein ranking each social media post further comprises using a customized score equal to the general score when no applicable preference factor exists for a social media post.

15. The method of claim 10, wherein the general score of a social media post is based on a posting account that authored the social media post, and wherein the general score of the social media post is reduced based on movement of a client device used to author the social media post.

16. The method of claim 10, wherein the general score of each social media post is based on at least one selected from a group consisting of user upvotes, user downvotes, total number of user votes, recency of user votes, user reviews, user-submitted emotional states, a number of user location check-ins, and geographic proximity to other popular venues.

17. The method of claim 10, wherein:

the request further includes a category indication, and identifying the set of temporally recent social media posts is further based on the category indication.

18. The method of claim 10, wherein the set of temporally recent social media posts comprise at least one selected from a group consisting of social media posts posted within the most recent 15 minutes, 30 minutes, 45 minutes, 1 hour, 2 hours, 3 hours, 12 hours, and 24 hours.

19. A non-transitory computer-readable storage medium comprising a plurality of instructions for providing location information on a social network, the plurality of instructions configured to execute on at least one computer processor to enable the at least one computer processor to:
- send, to a social mapping system, a request for one or more social media posts, wherein the request includes screen attribute information about a display of a client device specifying a geographic map region displayed on the client device, geographic location information, and an identification of a requesting account of the social network;
- receive, in response to the request, a suggested group for display by the client device, wherein the social mapping system:
  - identifies a set of temporally recent social media posts based on the screen attribute information and the geographic location information;
  - applies two sets of grouping criteria to the set of social media posts to generate a suggested group, wherein:
    - the suggested group is a subset of the set of social media posts, and
    - applying the two sets of grouping criteria comprises:
      - generating a combined ranking based on:
        - ranking each social media post of the set of social media posts according to a customized score for each social media post, wherein the customized score is based on a first set of preference factors, corresponding to the requesting account, applied to a general score of each social media post, and
        - ranking each social media post of the set of social media posts according to a second customized score for each social media post, wherein the second customized score is based on a second set of preference factors, corresponding to the requesting account, applied to the general score of each social media post, and
      - selecting, based on the combined ranking, the subset of the set of social media posts for inclusion in the suggested group, wherein the selecting comprises excluding at least one social media post of the set of social media posts from inclusion in the suggested group based on the combined ranking; and
- display, by the client device, the suggested group.

* * * * *